(12) United States Patent
Iwai et al.

(10) Patent No.: US 10,538,287 B2
(45) Date of Patent: Jan. 21, 2020

(54) BICYCLE CRANK ARM

(71) Applicant: Shimano Inc., Sakai, Osaka (JP)

(72) Inventors: Tooru Iwai, Osaka (JP); Tetsu Nonoshita, Osaka (JP); Toyoshi Yoshida, Osaka (JP)

(73) Assignee: Shimano Inc., Osaka (JP)

( * ) Notice: Subject to any disclaimer, the term of this patent is extended or adjusted under 35 U.S.C. 154(b) by 270 days.

(21) Appl. No.: 15/251,777

(22) Filed: Aug. 30, 2016

(65) Prior Publication Data

US 2018/0057106 A1 Mar. 1, 2018

(51) Int. Cl.
*B62M 3/00* (2006.01)
*B62M 1/36* (2013.01)

(52) U.S. Cl.
CPC .............. *B62M 1/36* (2013.01); *B62M 3/00* (2013.01)

(58) Field of Classification Search
CPC ....... B62M 1/36; B62M 3/00; Y10T 74/2165; Y10T 74/2164
See application file for complete search history.

(56) References Cited

U.S. PATENT DOCUMENTS

| 7,650,818 | B2 | 1/2010 | Inoue et al. |
| 7,850,564 | B2* | 12/2010 | Nonoshita ............. B62M 9/105 |
| | | | 474/152 |
| 8,616,085 | B2 | 12/2013 | Nonoshita et al. |
| 2008/0312016 | A1 | 12/2008 | Chiang et al. |
| 2014/0196569 | A1 | 7/2014 | Nonoshita et al. |
| 2015/0000459 | A1* | 1/2015 | Nonoshita ............. B62K 19/16 |
| | | | 74/594.1 |

FOREIGN PATENT DOCUMENTS

CN 201179942 Y 1/2009

* cited by examiner

*Primary Examiner* — Daniel D Yabut
(74) *Attorney, Agent, or Firm* — Global IP Counselors, LLP

(57) ABSTRACT

A bicycle crank arm is basically provided that includes a first structural member and a second structural member attached to the first structural member. The first structural member is made of a first material including a non-metallic material. The second structural member is made of a second material that is different from the first material.

23 Claims, 20 Drawing Sheets

BICYCLE CRANK ARM

BACKGROUND

Field of the Invention

This invention generally relates to a bicycle crank arm.

Background Information

In the past, most bicycle components were constructed of mainly metal parts. For example, in the past, crank arms, crank axles and chain rings were made of a single piece of metal, such as a forged metal member. Thus, these bicycle components were relatively heavy. More recently, bicycle components have been constructed of lighter weight metal alloys and/or have been constructed of several pieces to reduce weight. Examples of some composite bicycle components are disclosed in U.S. Pat. No. 7,650,818 B2, U.S. Pat. No. 8,616,085 B2 and U.S. Patent Application Publication No. 2008/0312016 A1.

SUMMARY

Generally, the present disclosure is directed to various features of a bicycle crank arm.

In view of the state of the known technology and in accordance with a first aspect of the present disclosure, a bicycle crank arm is basically provided that includes a first structural member and a second structural member attached to the first structural member. The first structural member is made of a first material including a non-metallic material. The second structural member is made of a second material that is different from the first material. According to the first aspect of the present invention, the bicycle crank arm achieves weight savings, thereby providing a lighter crank arm.

In accordance with a second aspect of the present invention, the bicycle crank arm according to the first aspect is configured such that at least one of the first structural member and the second structural member includes at least one of a crank axle receiving portion and a pedal axle receiving portion. According to the second aspect of the present invention, the bicycle crank arm is lightweight and can reliably support a crank axle and a pedal axle in an assembled state.

In accordance with a third aspect of the present invention, the bicycle crank arm according to one of the first aspect and the second aspect is configured so that one of the first structural member and the second structural member includes both of the crank axle receiving portion and the pedal axle receiving portion. According to the third aspect of the present invention, the bicycle crank arm is lightweight and can reliably support a crank axle and a pedal axle in an assembled state.

In accordance with a fourth aspect of the present invention, the bicycle crank arm according to the second aspect is configured so that one of the first structural member and the second structural member includes one of the crank axle receiving portion and the pedal axle receiving portion, and the other of the first structural member and the second structural member includes the other of the crank axle receiving portion and the pedal axle receiving portion. According to the fourth aspect of the present invention, the bicycle crank arm is lightweight and can reliably support a crank axle and a pedal axle in an assembled state.

In accordance with a fifth aspect of the present invention, the bicycle crank arm according to any one of the second to fourth aspects is configured so that each of the first structural member and the second structural member extends at least between the crank axle receiving portion and the pedal axle receiving portion in a state where the first structural member and the second structural member are attached to each other. According to the fifth aspect of the present invention, the bicycle crank arm is lightweight and can reliably support a crank axle and a pedal axle in an assembled state.

In accordance with a sixth aspect of the present invention, the bicycle crank arm according to any one of the second to fifth aspects is configured so that the crank axle receiving portion and the pedal axle receiving portion are made of a metallic material. According to the sixth aspect of the present invention, the bicycle crank arm is lightweight and can further reliably support a crank axle and a pedal axle in an assembled state.

In accordance with a seventh aspect of the present invention, the bicycle crank arm according to any one of the first to sixth aspects is configured so that the second material is a metallic material. According to the seventh aspect of the present invention, a bicycle crank arm is provided having sufficient rigidity because the second structural member is made of a metallic material.

In accordance with an eighth aspect of the present invention, the bicycle crank arm according to any one of the first to sixth aspects is configured so that the second material includes a non-metallic material. According to the eighth aspect of the present invention, a bicycle crank arm is provided that is more lightweight because the second structural member is made of a non-metallic material.

In accordance with a ninth aspect of the present invention, the bicycle crank arm according to the eighth aspect is configured so that the non-metallic material is a carbon-reinforced material. According to the ninth aspect of the present invention, a bicycle crank arm is provided that is lightweight and has sufficient rigidity because the second structural member is made of a carbon-reinforced material.

In accordance with a tenth aspect of the present invention, the bicycle crank arm according to any one of the first to ninth aspects is configured to include a reinforcement member configured to reinforce one of the first structural member and the second structural member. According to the tenth aspect of the present invention, a bicycle crank arm is provided having sufficient rigidity because one of the first structural member and the second structural member is reinforced by the reinforcement member.

In accordance with an eleventh aspect of the present invention, the bicycle crank arm according to the tenth aspect is configured so that the one of the first structural member and the second structural member has a longitudinal centerline, and the reinforcement member extends in a longitudinal direction parallel to the longitudinal center line. According to the eleventh aspect of the present invention, one of the first structural member and the second structural member is effectively reinforced because the reinforcement member extends in a longitudinal direction of the one of the first structural member and the second structural member.

In accordance with a twelfth aspect of the present invention, the bicycle crank arm according to the tenth or eleventh aspect is configured so that the reinforcement member includes a first reinforcement portion disposed in a vicinity of a first longitudinal side edge of the one of the first structural member and the second structural member, and a second reinforcement portion disposed in a vicinity of a second longitudinal side edge of the one of the first structural member and the second structural member. According to the twelfth aspect of the present invention, one of the first structural member and the second structural member is effectively reinforced because of the first reinforcement portion and the second reinforcement portion.

In accordance with a thirteenth aspect of the present invention, the bicycle crank arm according to any one of the tenth to twelfth aspects is configured so that the reinforcement member is a separate member from the one of the first structural member and the second structural member. According to the thirteenth aspect of the present invention, a bicycle crank arm is provided in which freedom of material selection for a reinforcement member is expanded.

In accordance with a fourteenth aspect of the present invention, the bicycle crank arm according to any one of the tenth to thirteenth aspects is configured so that the reinforcement member is attached to the one of the first structural member and the second structural member by an adhesive. According to the fourteenth aspect of the present invention, the reinforcement member is easily and sufficiently attached to one of the first structural member and second structural member.

In accordance with a fifteenth aspect of the present invention, the bicycle crank arm according to any one of the tenth to thirteenth aspects is configured so that the reinforcement member is integrally molded to the one of the first structural member and the second structural member. According to the fifteenth aspect of the present invention, the manufacturing efficiency of a bicycle crank arm is improved.

In accordance with a sixteenth aspect of the present invention, the bicycle crank arm according to any one of the tenth to thirteenth aspects is configured so that the reinforcement member is made of a third material that is different from the first material. According to the sixteenth aspect of the present invention, the weight and rigidity of a bicycle crank arm is optimized.

In accordance with a seventeenth aspect of the present invention, the bicycle crank arm according to the sixteenth aspect is configured so that the third material is different from the second material. According to the seventeenth aspect of the present invention, the weight and rigidity of a bicycle crank arm is optimized.

In accordance with an eighteenth aspect of the present invention, the bicycle crank arm according to one of the sixteenth aspect or the seventeenth aspect is configured so that the first material has a density that is greater than a density of the third material. According to the eighteenth aspect of the present invention, a lightweight bicycle crank arm is provided.

In accordance with a nineteenth aspect of the present invention, the bicycle crank arm according to any one of the tenth to eighteenth aspects is configured to include a sprocket teeth mounting portion having an outer peripheral edge that surrounds the crank axle receiving portion, and the reinforcement member being disposed adjacent to the outer peripheral edge of the sprocket teeth mounting portion. According to the nineteenth aspect of the present invention, an outer peripheral edge of the sprocket teeth mounting portion is effectively reinforced.

In accordance with a twentieth aspect of the present invention, the bicycle crank arm according to the nineteenth aspect is configured so that the outer peripheral edge of the sprocket teeth mounting portion has an annular shape, and the reinforcement member extends along the outer peripheral edge of the sprocket teeth mounting portion. According to the twentieth aspect of the present invention, an outer peripheral edge of the sprocket teeth mounting portion is effectively reinforced.

In accordance with a twenty-first aspect of the present invention, the bicycle crank arm according to the twentieth aspect is configured so that the reinforcement member extends continuously along the outer peripheral edge of the sprocket teeth mounting portion. According to the twenty-first aspect of the present invention, an outer peripheral edge of the sprocket teeth mounting portion is effectively reinforced.

In accordance with a twenty-second aspect of the present invention, the bicycle crank arm according to any one of the tenth to twenty-first aspects is configured to include a sprocket teeth mounting portion having an outer peripheral edge that surrounds a crank axle receiving portion. The first structural member has at least one opening disposed between the outer peripheral edge and the crank axle receiving portion. The reinforcement member extends along an outer periphery of the at least one opening. According to the twenty-second aspect of the present invention, a bicycle crank arm is provided that is lightweight and has sufficient rigidity because of at least one opening and a reinforcement member extending along an outer periphery of the at least one opening.

In accordance with a twenty-third aspect of the present invention, the bicycle crank arm according to the twenty-second aspect is configured so that the reinforcement member extends continuously along the outer periphery of the at least one opening. According to the twenty-third aspect of the present invention, a bicycle crank arm is provided that is lightweight and has sufficient rigidity because of at least one opening and a reinforcement member extending along an outer periphery of the at least one opening.

In accordance with a twenty-fourth aspect of the present invention, the bicycle crank arm according to any one of the first to twenty-third aspects is configured to include a sprocket teeth mounting portion having an outer peripheral edge that surrounds the crank axle receiving portion. The sprocket teeth mounting portion is a separate member from the first structural member and the second structural member. According to the twenty-fourth aspect of the present invention, a bicycle crank arm is provided that is lightweight and has sufficient rigidity because of a sprocket teeth mounting portion having an outer peripheral edge that surrounds the crank axle receiving portion.

In accordance with a twenty-fifth aspect of the present invention, the bicycle crank arm according to the twenty-fourth aspect is configured so that the sprocket teeth mounting portion is made of a non-metallic material. According to the twenty-fifth aspect of the present invention, a bicycle crank arm is provided that is more lightweight because the second structural member is made of a non-metallic material.

In accordance with a twenty-sixth aspect of the present invention, the bicycle crank arm according to one of the twenty-fourth and the twenty-fifth aspects is configured so that the sprocket teeth mounting portion has an annular shape and a periphery of the sprocket teeth mounting portion engages with a periphery of one of the first structural member and the second structural member. According to the twenty-sixth aspect of the present invention, the sprocket teeth mounting portion can be properly located.

In accordance with a twenty-seventh aspect of the present invention, the bicycle crank arm according to any one of the first to twenty-sixth aspects is configured so that the second structural member is attached to the first structural member by an adhesive. According to the twenty-seventh aspect of the present invention, a lightweight bicycle crank arm is provided.

In accordance with a twenty-eighth aspect of the present invention, a bicycle crank arm is provided that basically comprises a first structural member, a second structural member attached to the first structural member, a crank axle receiving portion, and a pedal axle receiving portion. One of the crank axle receiving portion and the pedal axle receiving portion is disposed on one of the first structural member and the second structural member. The other of the crank axle receiving portion and the pedal axle receiving portion is disposed on the other of the first structural member and the second structural member. According to the twenty-eighth aspect of the present invention, a bicycle crank arm is provided in which a load from a bicycle crank axle and a bicycle pedal axle to each of a first structural member and a second structural member is dispersed.

In accordance with a twenty-ninth aspect of the present invention, a bicycle crank arm is provided that basically comprises a first structural member made of a first material, a second structural member made of a second material, and a reinforcement member configured to reinforce the first structural member. The reinforcement member is a separate member from the first structural member, and is made of a third material that is different from at least one of the first material and the second material. According to the twenty-ninth aspect of the present invention, a bicycle crank arm is provided that is lightweight and has sufficient rigidity. Further, a freedom of material selection for a reinforcement member is expanded.

In accordance with a thirtieth aspect of the present invention, the bicycle crank arm according to the twenty-ninth aspect is configured so that the third material is different from the second material. According to the thirtieth aspect of the present invention, a bicycle crank arm is provided in which weight and rigidity are optimized.

Also other objects, features, aspects and advantages of the disclosed bicycle crank arm will become apparent to those skilled in the art from the following detailed description, which, taken in conjunction with the annexed drawings, discloses exemplary embodiments of the bicycle crank arm.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
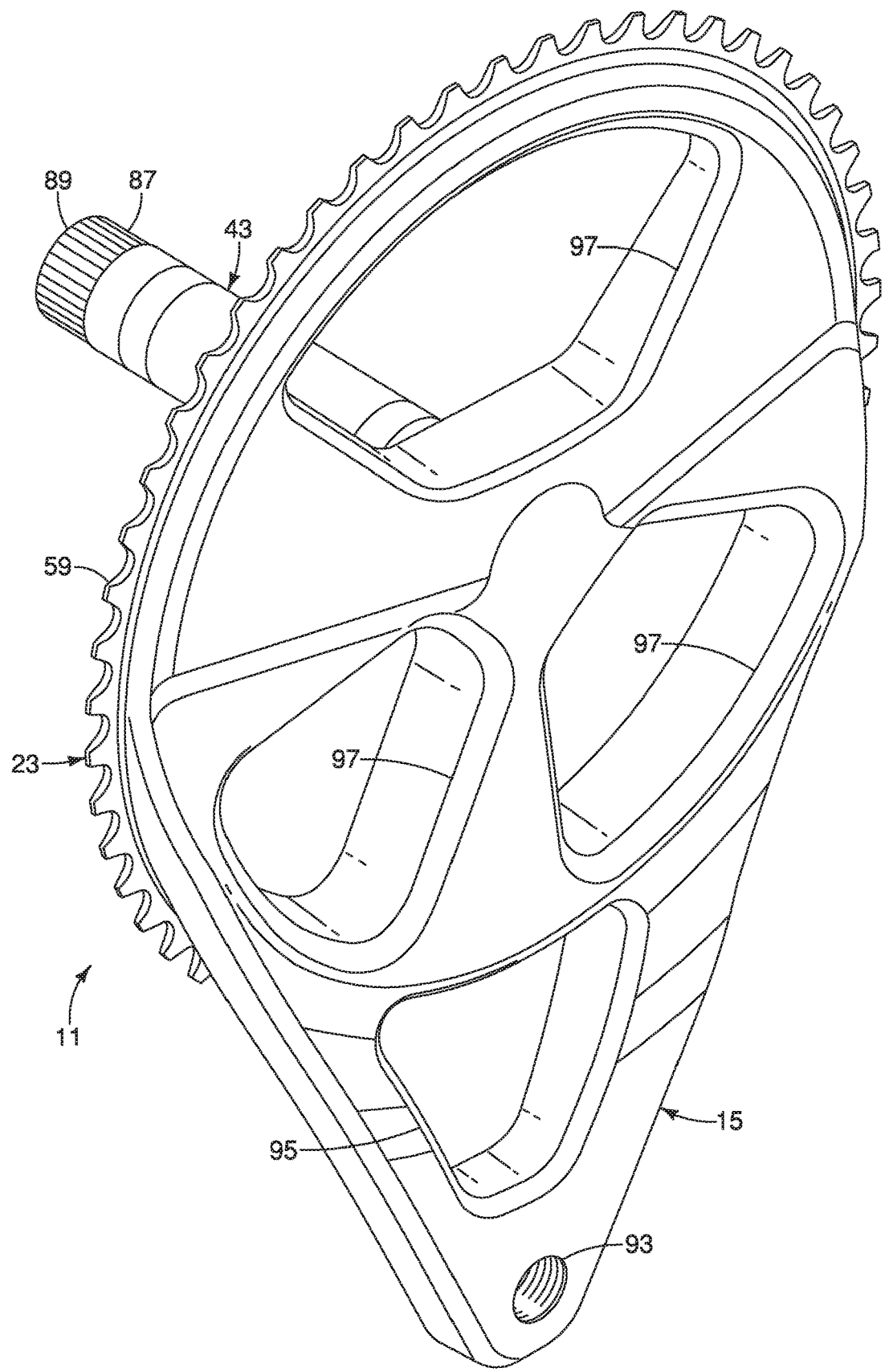
FIG. 1 is a perspective view of a bicycle crank arm in accordance with one illustrated embodiment.

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Because the various parts of a bicycle are well known in the bicycle art, these parts of the bicycle will not be discussed or illustrated in detail herein, except as they are modified in accordance with the exemplary embodiments of the present invention. It will be apparent to those skilled in the bicycle field from this disclosure that a bicycle crank arm in accordance with the exemplary embodiments of the present invention can have more sprockets.

Referring initially to FIGS. 1 to 9, a bicycle crank arm 11 is illustrated in accordance with a first exemplary embodiment of the present invention. The bicycle crank arm 11 of FIGS. 1 to 9 is for a road bike, although the crank arm of the present invention is not so limited. The bicycle crank arm 11 includes at least a base member (i.e., a first structural member) 13 and a cover member (i.e., a second structural member) 15. The bicycle crank arm 11 further includes a sprocket teeth mounting portion 21 and a tooth member 23. The base member 13 receives a pedaling force of a rider. The cover member 15 is disposed axially outward relative to the base member 13 with respect to a rotational axis A of the bicycle crank arm 11 to cover an axially outer side of the base member 13. The strength of the base member 13 is preferably greater than the strength of the cover member 15.

The base member 13 includes a first support member 17, a second support member 19 and a tooth member 23, as shown in FIGS. 5 to 9. The first support member 17 and the second support member 19 are preferably made of a carbon prepreg material, such that the base member (i.e., the first structural member) 13 is made of a first material that includes a non-metallic material.

Figure 3:
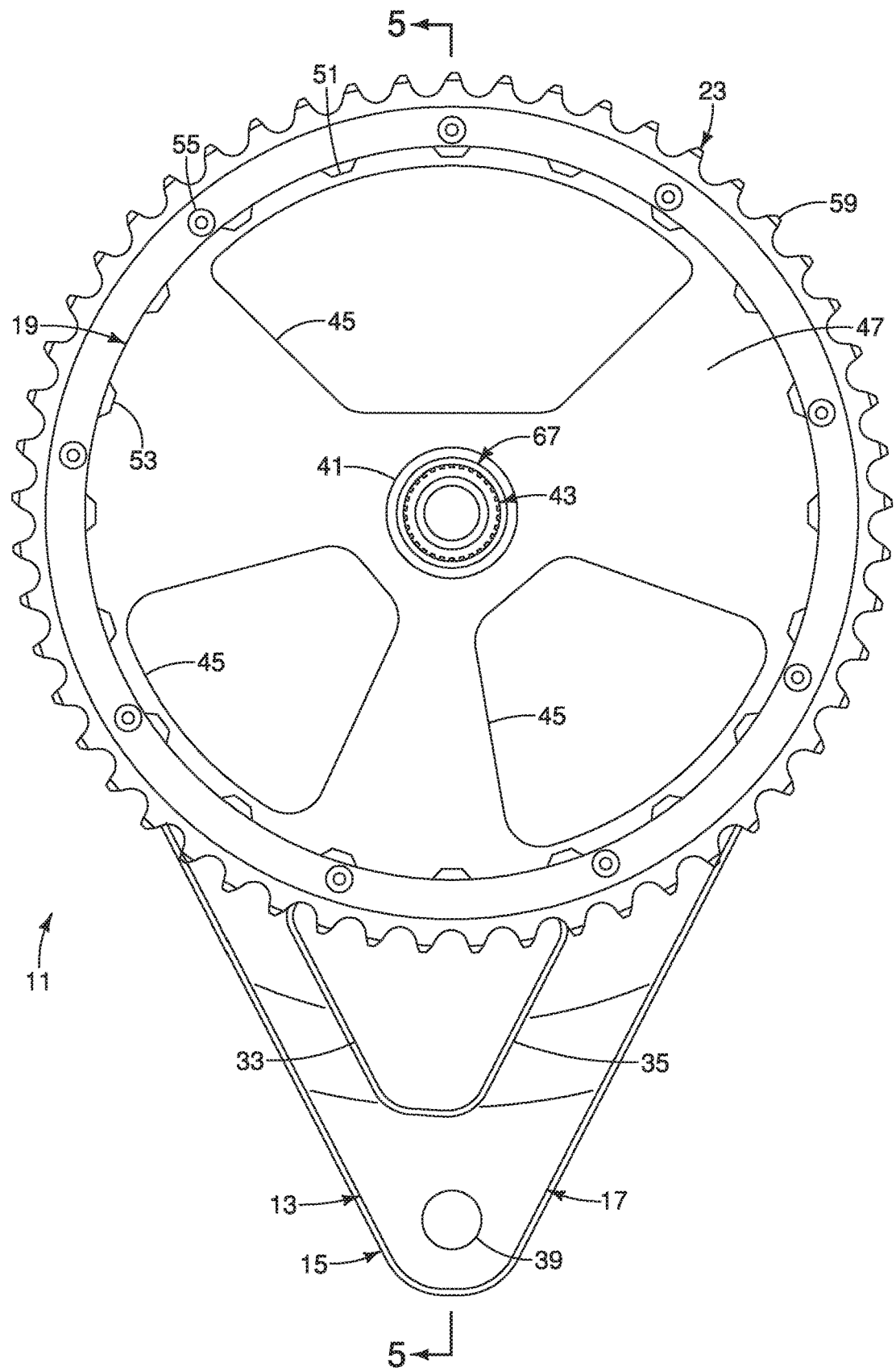
FIG. 3 is a rear elevational view of the base member of the bicycle crank arm of FIG. 1.
Figure 7:
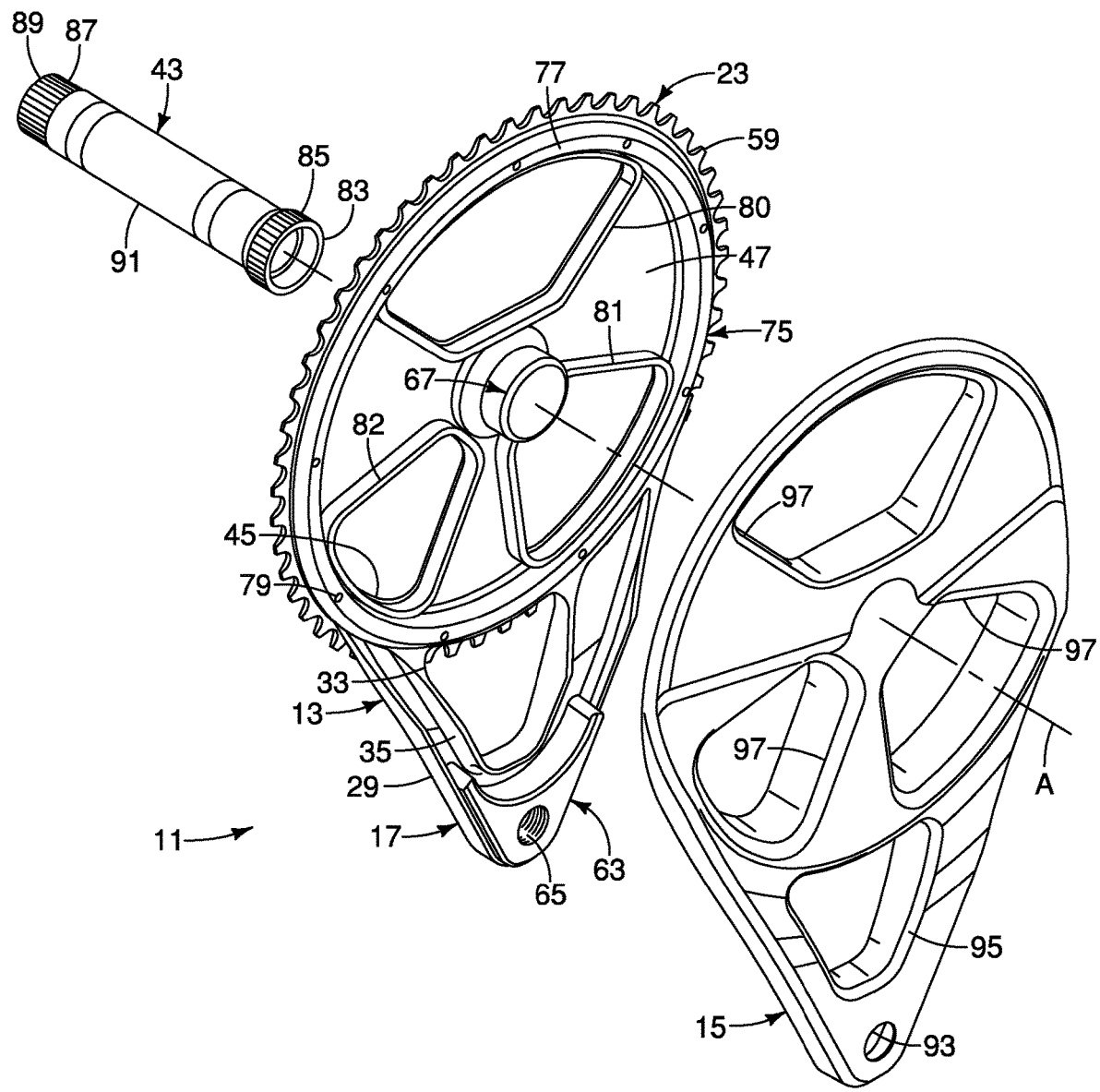
FIG. 7 is an exploded perspective view of the bicycle crank arm illustrated in FIG. 1.
Figure 8:
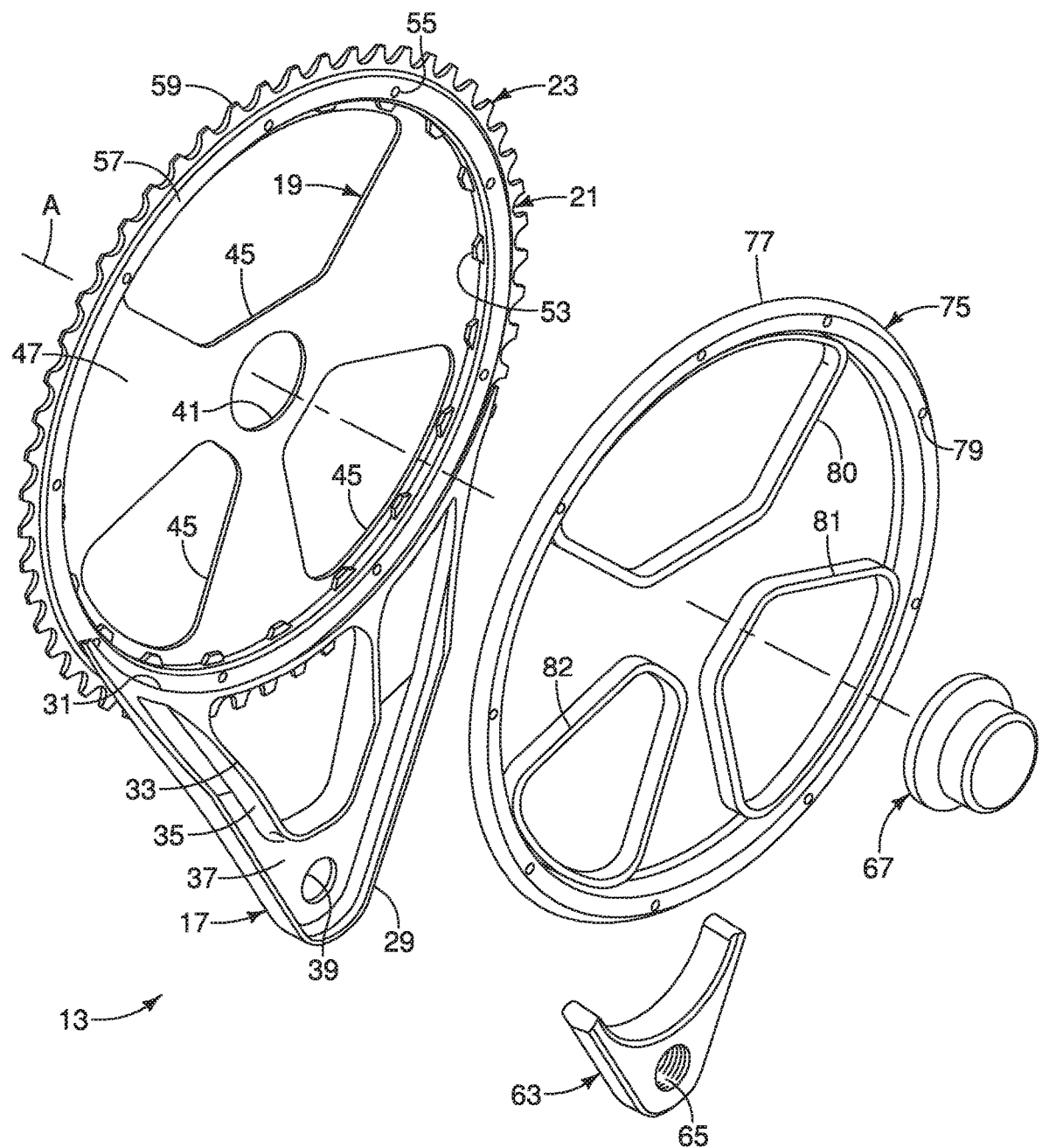
FIG. 8 is an exploded perspective view of the base member of the bicycle crank arm illustrated in FIG. 1.
Figure 9:
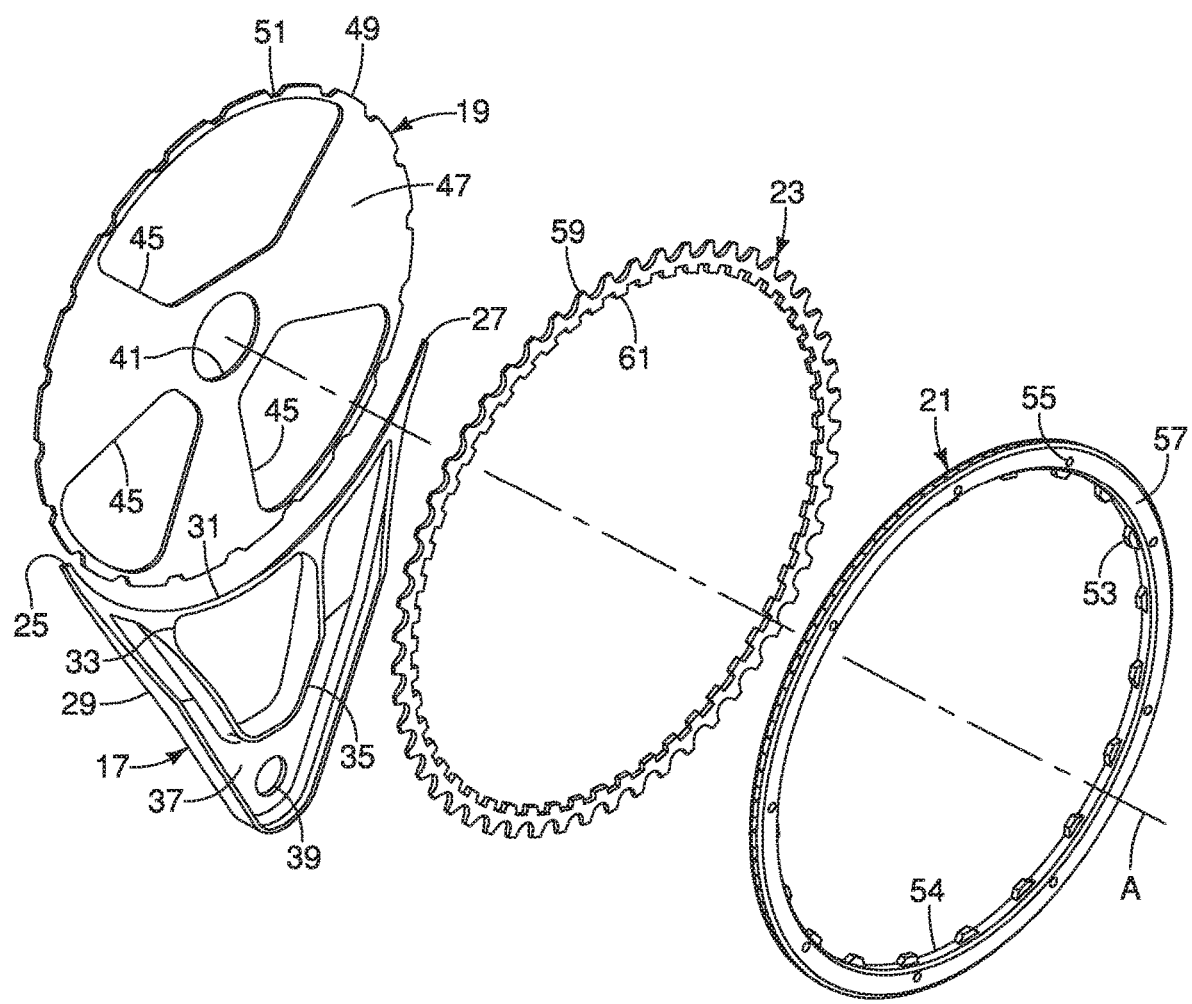
FIG. 9 is an exploded perspective view of selected components of the base member illustrated in FIG. 8.

The first support member 17 includes a first pedal axle receiving opening 39 though which a pedal axle passes, at an end of the first support member 17. The first support member 17 is a substantially triangular shaped member, as shown in FIGS. 7 to 9. A substantially V-shaped outer wall 29 extends from a first end 27 to a second end 25 of a substantially arcuate-shaped end 31 of the first support member 17. The outer wall 29 extends in an axial direction toward the cover member 15, as shown in FIG. 7. An opening 33 is disposed in the first support member 17, as shown in FIGS. 3 and 7. A portion of the opening 33 is defined by an inner wall 35. A cavity 37 is defined between the outer wall 29 and the inner wall 35. A first pedal axle receiving opening 39 is disposed in the cavity 37.

The second support member 19 is a substantially annular member, as shown in FIG. 9. The second support member 19 includes a crank axle receiving opening 41. The crank axle receiving opening 41 is substantially centered on the second support member 19 with respect to the rotational axis A to receive a crank axle 43. As shown in FIGS. 3 and 7 to 9, a plurality of openings 45 are disposed in a peripheral face 47 of the second support member 19 between the crank axle receiving opening 41 and an outer peripheral edge 49 of the second support member 19. The outer peripheral edge 49 of the second support member 19 has a plurality of radially inward extending recesses 51. The first support member 17 and the second support member 19 can be formed as separate members, as shown in FIG. 9. Alternatively, the first support member 17 and the second support member 19 can be formed as a one-piece, unitary member.

The sprocket teeth mounting portion 21 is a ring-shaped member, as shown in FIG. 9. In this embodiment, the sprocket teeth mounting portion 21 is supported on the second support member 19 of the base member 13. However, the sprocket teeth mounting portion 21 can be supported on the cover member 15. Further, although the sprocket teeth mounting portion 21 is a separate member from the base member 13 and the cover member 15, it can be formed as a one-piece unitary member of one of the base member 13 and the cover member 15. The sprocket teeth mounting portion 21 is preferably made of a non-metallic material, such as a resin. However, the sprocket teeth mounting portion 21 can be made of a metallic material such as steel, aluminum alloy and so on. The sprocket teeth mounting portion 21 includes a plurality of projections 53 extending radially inward with respect to the rotational axis A. In particular, the projections 53 extend from an inner peripheral surface 54 of the sprocket teeth mounting portion 21. The sprocket teeth mounting portion 21 includes a plurality of fastener openings 55 disposed in an outer peripheral edge 57 and extending in a direction substantially parallel to the rotational axis A.

The tooth member 23 is a ring shaped member that has a plurality of teeth 59 and a plurality of engaging parts 61. The tooth member 23 is integrally formed as a one-piece, unitary member and is made of a metallic material. The teeth 59 extend radially outward with respect to the rotation axis A. The engaging parts 61 extend radially inward with respect to the rotation axis A. The teeth 59 are illustrated as being substantially identical, however the teeth 59 can have a variety of configurations as needed and/or desired. The base member 13 can include a second sprocket teeth mounting portion configured to receive a second tooth member that is smaller (i.e., has fewer sprocket teeth) than the tooth member 23. In this embodiment, the tooth member 23 is attached to the base member 13 via the sprocket teeth mounting portion 21 that engages with the engaging parts 61 of the tooth member 23. However, the tooth member 23 can be directly attached to one of the base member 13 and the cover member 15.

The tooth member 23 is attached to an outer peripheral edge 57 of the sprocket teeth mounting portion 21, as shown in FIGS. 7 and 8. The tooth member 23 is connected to the sprocket teeth mounting portion 21 in any suitable manner, such as by molding or bonding, such that a one-piece, non-separable member is formed. The engaging parts 61 of the tooth member 23 facilitate forming a strong connection between the tooth member 23 and the sprocket teeth mounting portion 21. The sprocket teeth mounting portion 21 and the tooth member 23 form a composite bicycle component (i.e., a component including two or more members that are secured together to form a non-separable unit). The composite component includes one or more metallic parts and one or more resin parts that are secured together to be comparable in rigidity to an all metallic component while also providing weight-saving as compared to an all metallic component.

As shown in FIG. 9, a periphery of the sprocket teeth mounting portion 21 engages with a periphery of one of the first structural member (the base member 13) and a second structural member (the cover member 15). In this embodiment, an inner peripheral surface of the sprocket teeth mounting portion 21 engages with an outer peripheral surface of the second support member 19. More specifically, the plurality of recesses 51 disposed on the outer peripheral surface of the second support member 19 engages with the plurality of projections 53 of the sprocket teeth mounting portion 21 such that the second support member 19 can be properly located in the sprocket teeth mounting portion 21. Alternatively, the second support member 19 can include a plurality of projections and the sprocket teeth mounting portion 21 can include a plurality of recesses to engage with the plurality of the projections. The first support member 17 is connected to the outer peripheral edge 57 of the sprocket teeth mounting portion 21, as shown in FIG. 8, in any suitable manner, such as with an adhesive.

Figure 5:
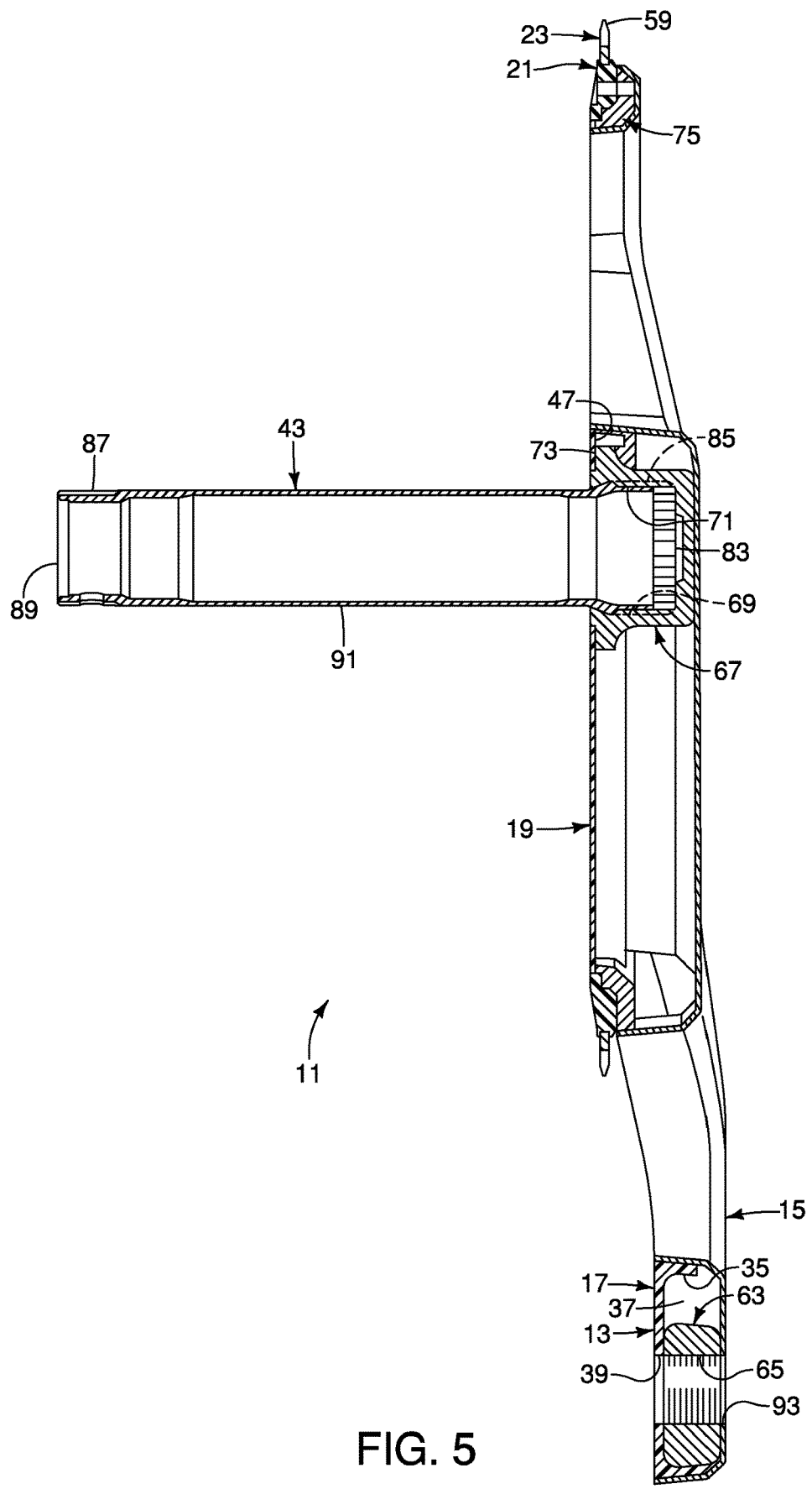
FIG. 5 is side elevational view in cross section taken along line 5-5 of the bicycle crank arm illustrated in FIG. 3.

A pedal axle receiving portion 63 is disposed in the cavity 37 in the first support member 17, as shown in FIGS. 5, 7 and 8. A second pedal axle receiving opening 65 is disposed in the pedal axle receiving portion 63 and aligned with the first pedal axle receiving opening 39 in the first support member 17. The second pedal axle receiving opening 65 is preferably threaded to facilitate receiving a pedal (not shown). The pedal axle receiving portion 63 is connected to the first support member 17 in any suitable manner, such as with an adhesive. The pedal axle receiving portion 63 is preferably made of a metallic material, although the pedal axle receiving portion 63 can be made of any suitable material.

A crank axle receiving portion 67 is disposed on the peripheral face 47 of the second support member 19, as shown in FIGS. 5, 7 and 8. The crank axle receiving portion 67 has an axially extending bore 71 configured to receive the crank axle 43. A plurality of splines 69 extend radially inward to engage the crank axle 43. A shoulder 73 is disposed on the crank axle receiving portion 67 to engage the crank axle receiving opening 41 in the second support member 19, as shown in FIG. 5. The shoulder 73 engages the peripheral face 47 of the second support member 19 to prevent the crank axle receiving portion 67 from completely passing through the second support member 19. The crank axle receiving portion 67 is mounted to the second support member 19 on an opposite side of the second support member 19 through which the crank axle 43 is inserted.

Accordingly, one of the base member (i.e., the first structural member) 13 and the cover member (i.e., the second structural member) 15 includes a sprocket teeth mounting portion 21 having an outer peripheral edge that surrounds the crank axle receiving portion 67. The crank axle receiving portion 67 is mounted to the peripheral face 47 of the second support member 19 in any suitable manner, such as with an adhesive. The crank axle receiving portion 67 is preferably made of a metallic material, although the crank axle receiving portion 67 can be made of any suitable material. The crank axle receiving portion 67 can include at least one radially extending arm extending along the peripheral face 47 of the second support member 19 to reinforce an attachment between the crank axle receiving portion 67 and the base member 13.

As shown in FIG. 7, the pedal axle receiving portion 63 and the crank axle receiving portion 67 are disposed on the base member 13. Accordingly, one of the base member (i.e., the first structural member) 13 and the cover member (i.e., the second structural member) 15 includes both of the crank axle receiving portion 67 and the pedal axle receiving portion 63. Alternatively, the pedal axle receiving portion 63 and the crank axle receiving portion 67 can be disposed on the cover member 15. Alternatively, one of the pedal axle receiving portion 63 and the crank axle receiving portion 67 can be disposed on the base member 13, and the other of the pedal axle receiving portion 63 and the crank axle receiving portion 67 can be disposed on the cover member 15. Accordingly, at least one of the base member (i.e., the first structural member) 13 and the cover member (i.e., the second structural member) 15 includes at least one of the crank axle receiving portion 67 and the pedal axle receiving portion 63.

A reinforcement member 75 is configured to reinforce one of the base member 13 (i.e., the first structural member) and the cover member 15 (i.e., the second structural member), as shown in FIGS. 5 to 8. In the illustrated exemplary embodiment shown in FIGS. 1-9, the reinforcement member 75 is attached to the base member 13, although the reinforcement member 75 can be similarly attached to the cover member 15. The reinforcement member 75 is preferably made of carbon. The reinforcement member 75 can be attached to both of the cover member 15 and the base member 13.

Figure 6:
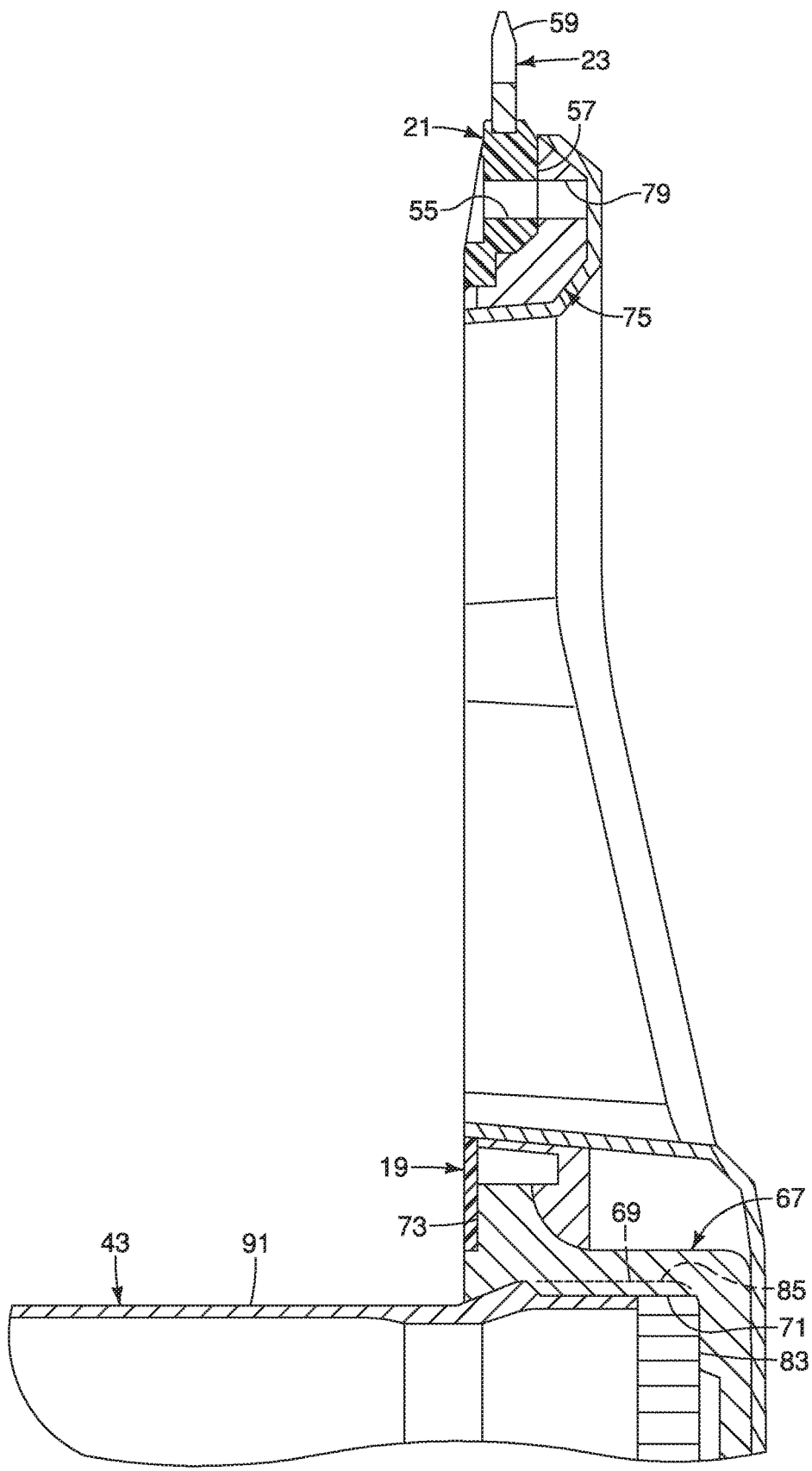
FIG. 6 is a partial enlarged view in cross section of the bicycle crank arm illustrated in FIG. 5.

The reinforcement member 75 includes an annular reinforcement portion 77 having a plurality of fastener openings 79 disposed therein. The fastener openings 79 are aligned with the fastener openings 55 in the sprocket teeth mounting portion 21, as shown in FIGS. 5 and 6, such that suitable fastening members, such as rivets, screws, can be used to secure the sprocket teeth mounting portion 21 to the reinforcement member 75. As shown in FIG. 6, the reinforcement member 75 is disposed adjacent to the outer peripheral edge 57 of the sprocket teeth mounting portion 21. As shown in FIG. 8, the outer peripheral edge 57 of the sprocket teeth mounting portion 21 has an annular shape such that the reinforcement member 75 extends along the outer peripheral edge 57 of the sprocket teeth mounting portion 21. As shown in FIGS. 7 and 8, the reinforcement member 75 extends continuously (entire circumference) along the outer peripheral edge 57 of the sprocket teeth mounting portion 21.

As shown in FIGS. 7 and 8, the reinforcement member 75 includes three reinforcement portions 80 to 82 disposed between the annular reinforcement portion 77 and the crank axle receiving portion 67. The reinforcement portions 80 to 82 are preferably ribs shaped to correspond to the plurality of openings 45 in the second support member 19. Empty space is formed within each of the reinforcement portions 80 to 82 and between adjacent reinforcement portions. The illustrated exemplary embodiment is shown with three reinforcement portions 80 to 82, although any suitable number of reinforcement portions can be used. Portions of each of the reinforcement portions 80 to 82 extend along the outer peripheral edge 57 of the sprocket teeth mounting portion 21. The base member (i.e., the first structural member) 13 has at least one opening 45 disposed between the outer peripheral edge 57 and a crank axle receiving portion 67. The reinforcement member 75 extends along an outer periphery of the at least one opening 45, as shown in FIGS. 7 and 8. The reinforcement member 75 extends continuously along the outer periphery of the at least one opening 45. Each of the reinforcement portions 80 to 82 extends continuously along the outer periphery of a separate opening 45 such that each opening 45 has a separate reinforcement portion.

The reinforcement member 75 can be attached to the base member 13 in any suitable manner. Preferably, the reinforcement member 75 is integrally molded to the base member. The reinforcement member 75 can be integrally molded to the base member 13, or the base member 13 can be integrally molded to the reinforcement member 75. Preferably, the reinforcement member 75 is fixedly secured to the base member 13 by an integral molding process so that the resin of the reinforcement member 75 extends into the base member 13 during the formation of the reinforcement member 75. The term "integral molding process" as used herein refers to molding of the reinforcement member 75, which is at least partially made of resin, while simultaneously attaching the reinforcement member 75 to the base member 13. In such embodiment, the reinforcement member 75 is preferably made of a thermoplastic resin material. Alternatively, the reinforcement member 75 can be formed as a one-piece, unitary member with the base member 13.

The reinforcement member 75 is made of a third material that is different from the first material from which the base member is made. The first material has a density that is greater than a density of the third material. The third material is different from the second material from which the cover member is made. Accordingly, the reinforcement member is integrally molded to the one of the base member (i.e., the first structural member) 13 and the cover member (i.e., the second structural member) 15.

Alternatively, the reinforcement member 75 is a separate member from the base member 13 and is attached thereto by an adhesive. In such embodiment, the reinforcement member is preferably made of a thermosetting resin material. The reinforcement member 75 is made of a third material that is different from the first material from which the base member is made. The first material has a density that is greater than a density of the third material. The third material is different from the second material from which the cover member is made. Accordingly, the reinforcement member 75 is a separate member from the one of the base member (i.e., the first structural member) 13 and the cover member (i.e., the second structural member) 15. The reinforcement member 75 is attached to the one of the base member (i.e., the first structural member) 13 and the cover member (i.e., the second structural member) 15 by an adhesive. Alternatively, the base member 13 and the reinforcement member 75 can be formed as a one-piece, unitary member.

Figure 4:
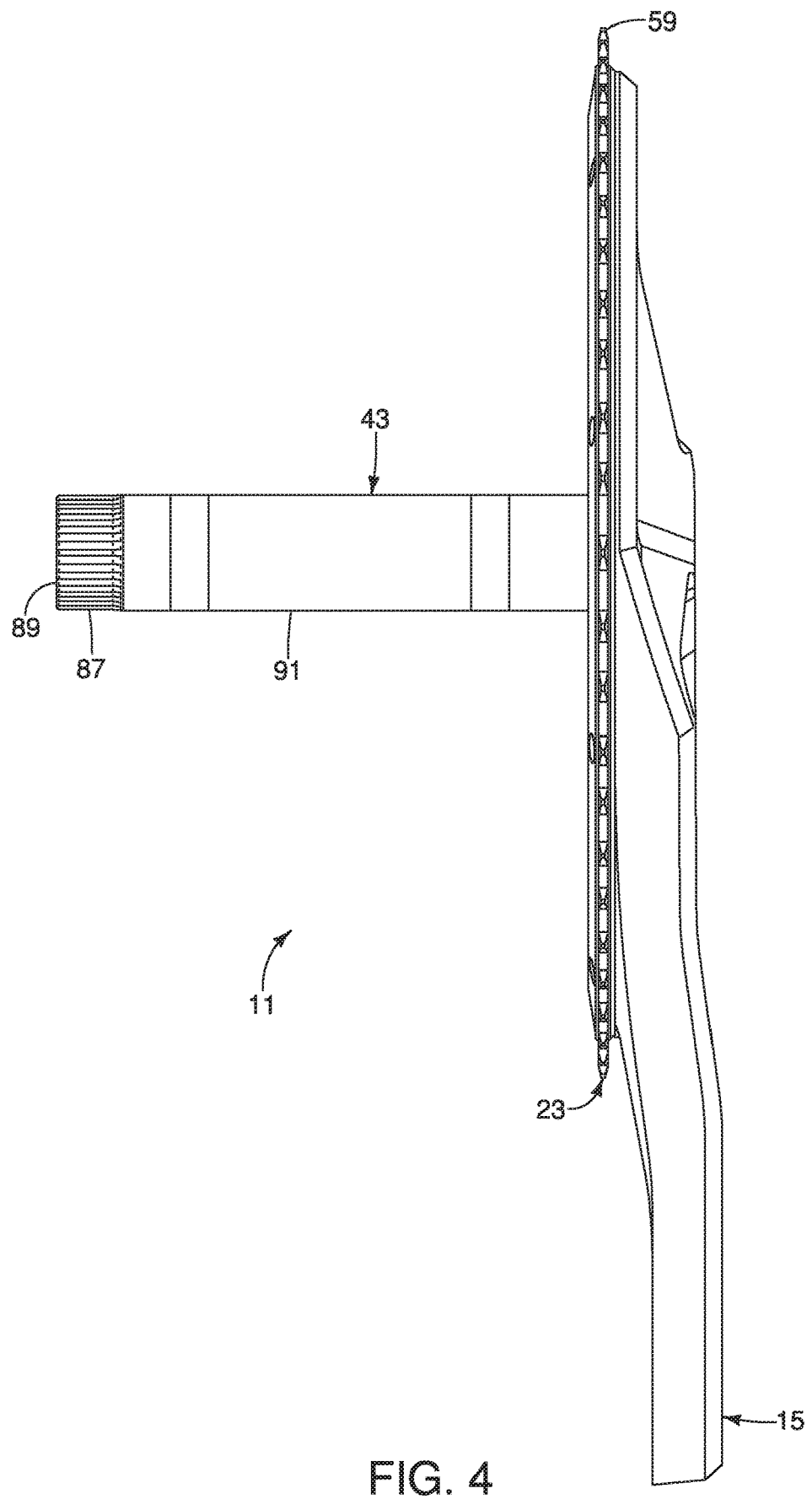
FIG. 4 is a side elevational view in cross section of the bicycle crank arm of FIG. 1.

The bicycle crank arm 11 is non-rotatably mounted to a first end portion 83 of a crank axle 43, as shown in FIGS. 1 and 4 to 7. The crank axle 43 is preferably a hollow pipe-shaped member made of chrome-molybdenum steel or another such highly rigid alloy, for example. The first end portion 83 of the crank axle 43 is fixed to the bicycle crank arm 11 in any suitable manner, such as by press-fitting, swaging, crimping and/or an adhesive, for example. In the illustrated embodiment, the adhesive can be any suitable adhesive, such as an epoxy type adhesive. The crank axle 43 includes a plurality of axially extending first splines 85 disposed at the first end portion 83 of the crank axle 43, and a plurality of axially extending second splines 87 disposed at a second end portion 89 of the crank axle 43. The first splines 85 are configured and arranged to extend radially outward from an outer peripheral surface 91 of the crank axle 43, and the second splines 87 are configured and arranged not to protrude radially outward relative to the outer peripheral surface 91 of the crank axle 43, as shown in FIGS. 4 and 5. The first splines 85 engage the splines 69 of the crank axle receiving portion 67 such that the crank axle 43 and the bicycle crank arm 11 rotate as a unit. The crank axle 43 is attached to the crank axle receiving portion 67 of the bicycle crank arm 11 as discussed below. The second end portion 89 of the crank axle is connected to another crank arm (not shown).

Figure 2:
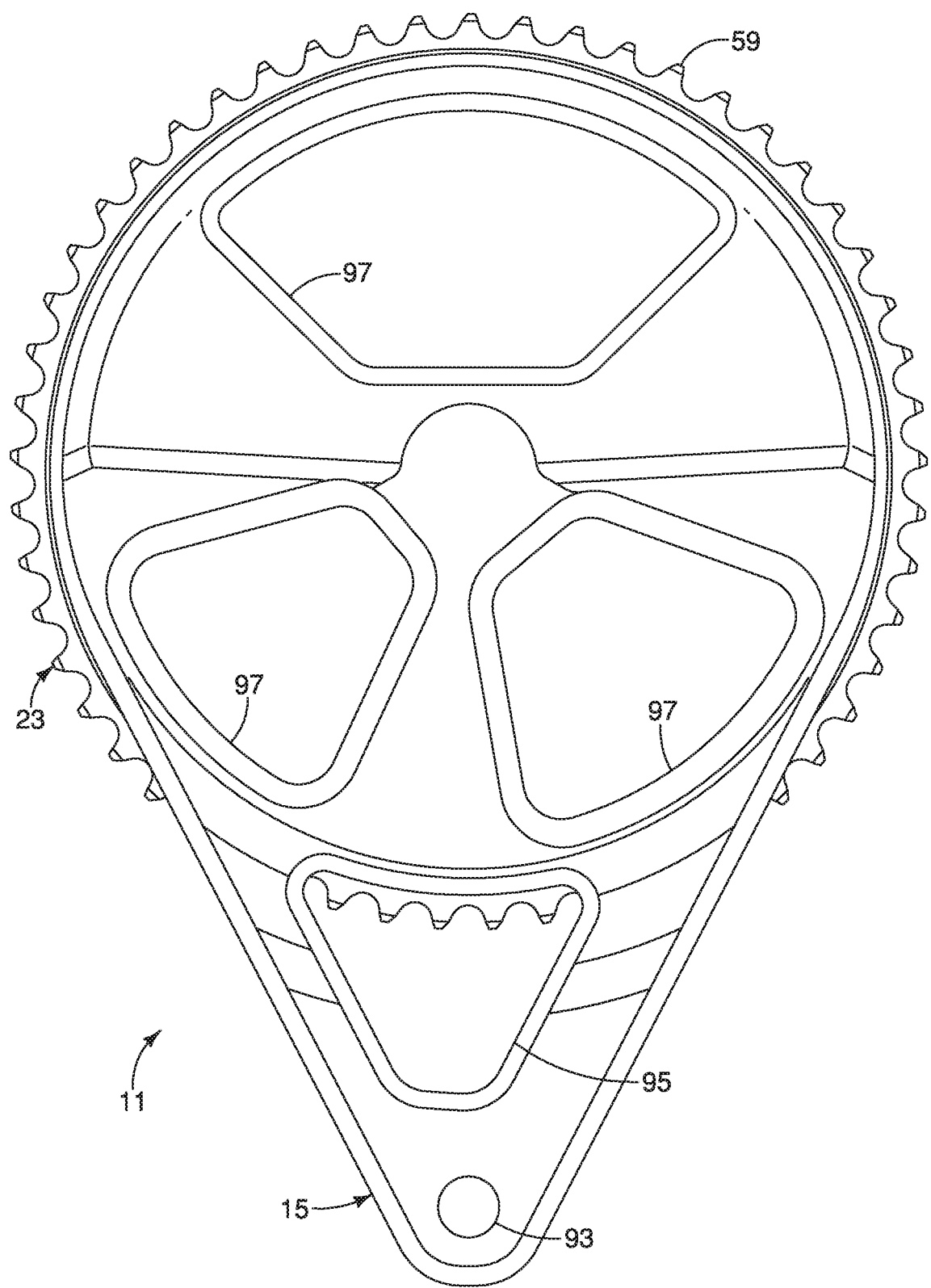
FIG. 2 is a front elevational view of a base member of the bicycle crank arm of FIG. 1.

The cover member 15 is preferably integrally formed as a one-piece, unitary member, as shown in FIGS. 1, 2 and 7. The cover member 15 is attached to the base member 13 to cover the base member 13. The cover member 15 has a fastener opening 93 aligned with the first pedal axle receiving opening 39 in the first support member 17 and the pedal axle receiving opening 65 in the pedal axle receiving portion 63 when the cover member 15 is attached to the base member 13. The cover member 15 has a lower opening 95 aligned with the opening 33 in the first support member 17 when the cover member 15 is attached to the base member 13. A substantially hollow portion is formed between the first support member 17 and the cover member 15. The cover member 15 has a plurality of upper openings 97 aligned with the plurality of openings 45 in the second support member 19 when the cover member 15 is attached to the base member 13.

The cover member (i.e., the second structural member) 15 is formed of a second material that is different from the first material of which the base member 13 is made. The cover member 15 is preferably made of any suitable material, including, but not limited to, an aluminum alloy or a non-metallic material, such as a carbon reinforced material. Accordingly, the second material can be a metallic material, i.e., an aluminum alloy. Alternatively, the second material can include a non-metallic material, such that the second material is a carbon-reinforced material. The cover member 15 (i.e., the second structural member) is attached to the base member (i.e., the first structural member) 13 in any suitable manner, such as with an adhesive. An adhesive can be applied to the reinforcement member 75 to further secure the cover member 15 to the reinforcement member 75. As shown in FIG. 5, for example, each of the base member (i.e., the first structural member) 13 and the cover member (i.e., the second structural member) 15 extends at least between the crank axle receiving portion 67 and the pedal axle receiving portion 63 in a state where the base member (i.e., the first structural member) 13 and the cover member (i.e., the second structural member) 15 are attached to each other.

Figure 10:
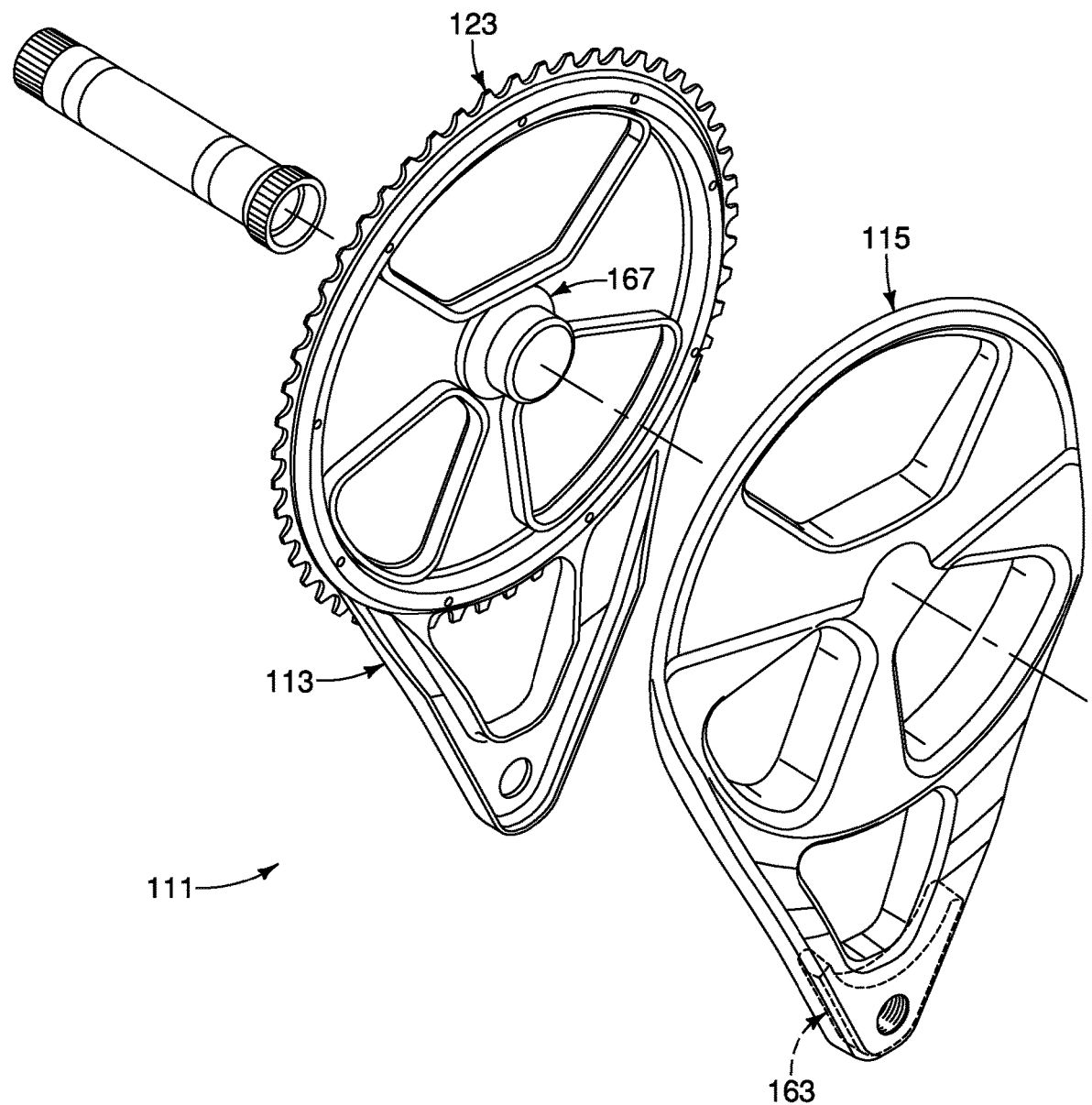
FIG. 10 is an exploded perspective view of a bicycle crank arm in accordance with another illustrated embodiment.

As shown in FIG. 10, a bicycle crank arm 111 in accordance with a second exemplary embodiment of the present invention is substantially similar to the bicycle crank arm 11 of the first exemplary embodiment except for the differences described below. Similar parts are identified with similar reference numerals, except increased by 100 (i.e., 1xx, accordingly).

The bicycle crank arm 111 includes a base member (i.e., a first structural member) 113 and a cover member (i.e., a second structural member) 115 attached to the base member 113, as shown in FIG. 10. The bicycle crank arm 111 also includes a crank axle receiving portion 167 and a pedal axle receiving portion 163.

One of the crank axle receiving portion 167 and the pedal axle receiving portion 163 is disposed on one of the base member (i.e., the first structural member) 113 and the cover member (i.e., the second structural member) 115; and the other of the crank axle receiving portion 167 and the pedal axle receiving portion 163 is disposed on the other of the base member (i.e., the first structural member) 113 and the cover member (i.e., the second structural member) 115. As shown in FIG. 10, the crank axle receiving portion 167 is disposed on the base member 113 (i.e., the first structural member) and the pedal axle receiving portion 163 is disposed on the cover member 115 (i.e., the second structural member). Alternatively, the crank axle receiving portion 167 can be disposed on the cover member 115 (i.e., the second structural member) and the pedal axle receiving portion 163 can be disposed on base member 113 (i.e., the first structural member). Accordingly, one of the base member (i.e., the first structural member) 113 and the cover member (i.e., the second structural member) 115 includes one of the crank axle receiving portion 167 and the pedal axle receiving portion 163, and the other of the base member (i.e., the first structural member) 113 and the cover member (i.e., the second structural member) 115 includes the other of the crank axle receiving portion 167 and the pedal axle receiving portion 163. Alternatively, both of the crank axle receiving portion 167 and the pedal axle receiving portion 163 can be disposed on the cover member 115.

Referring initially to FIGS. 11 to 20, a bicycle crank arm 211 is illustrated in accordance with a third exemplary embodiment of the present invention. The bicycle crank arm 211 of FIGS. 11 to 20 is for a mountain bike, although the bicycle crank arm of the present invention is not so limited. The bicycle crank arm 211 includes at least a base member (i.e., a first structural member) 213 and a cover member (i.e., a second structural member) 215. The base member 213 mainly receives a pedaling force of a rider. The cover member 215 is disposed axially outward relative to the base member 213 with respect to a rotational axis A of the bicycle crank arm 211 to cover an axially outer side of the base member 213. The strength of the base member 213 is preferably greater than the strength of the cover member 215.

Figure 15:
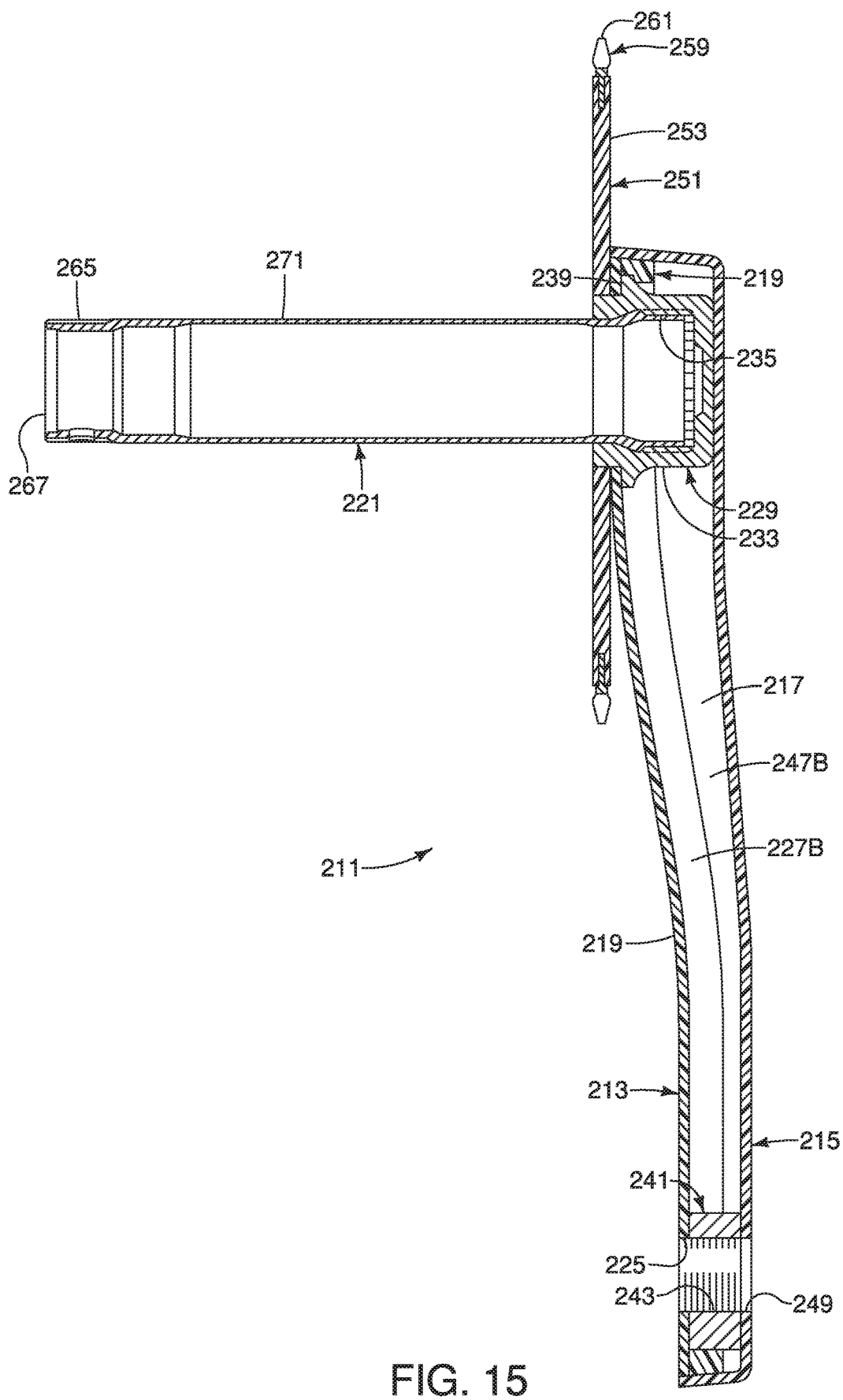
FIG. 15 is a side elevational view in cross section taken along line 15-15 of the bicycle crank arm illustrated in FIG. 13.

The cover member 215 is attached to the base member 213, as shown in FIG. 15. The base member 213 is made of a first material including a non-metallic material, such as carbon prepreg. The cover member 215 is made of a second material that is different from the first material, such as an aluminum alloy or a carbon reinforced material. In the illustrated embodiment, the base member 213 is integrally formed as a one-piece, unitary member, and the cover member 215 is integrally formed as a one-piece, unitary member. The base member 213 and the cover member 215 are fixedly coupled to each other with, for example, an adhesive. In the illustrated embodiment, the base member 213 and the cover member 215 are coupled together such that a substantially hollow, interior space 217 is formed therebetween.

Figure 18:
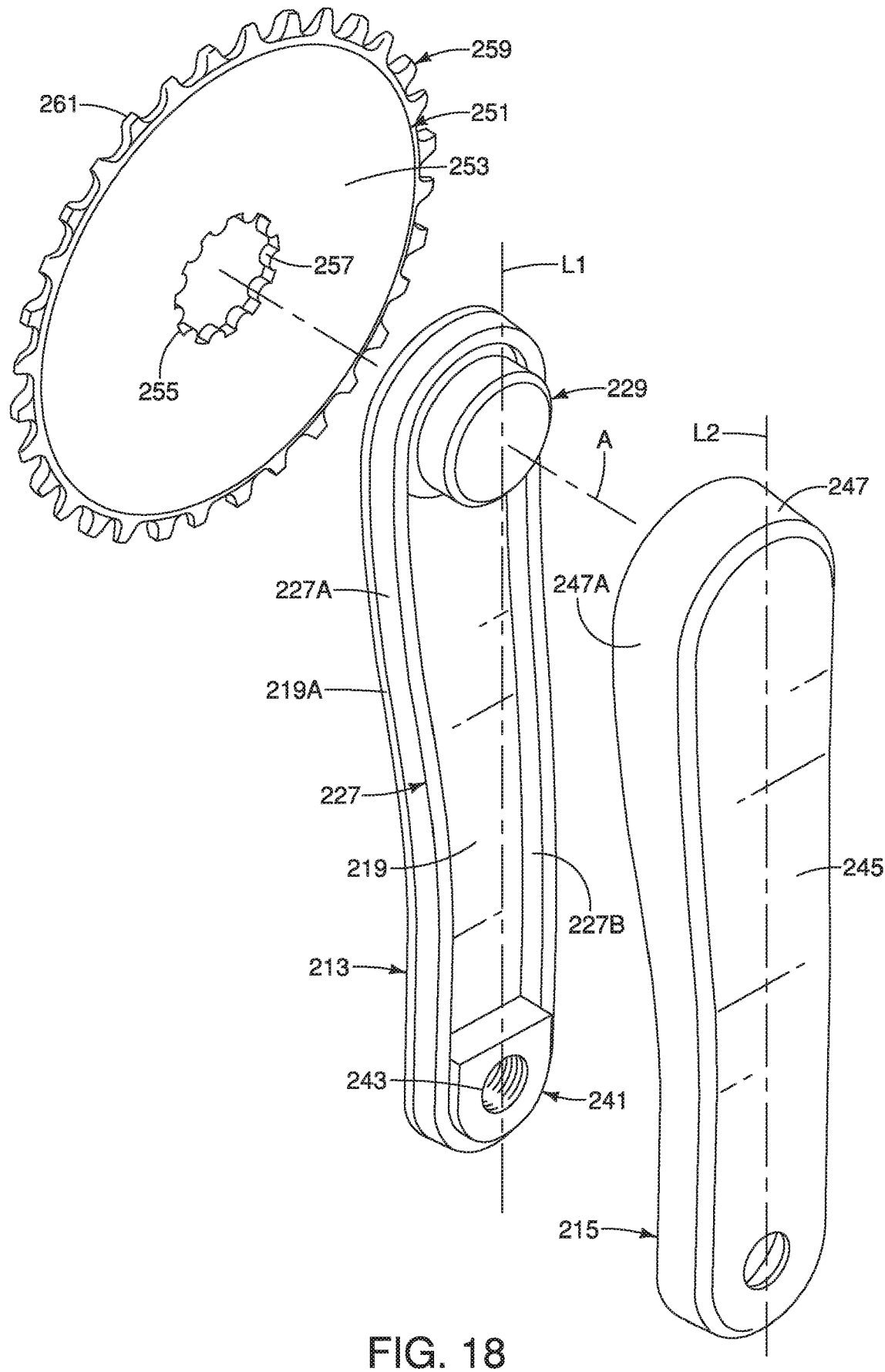
FIG. 18 is an exploded perspective view of selected components of the bicycle crank arm illustrated in FIG. 11.
Figure 19:
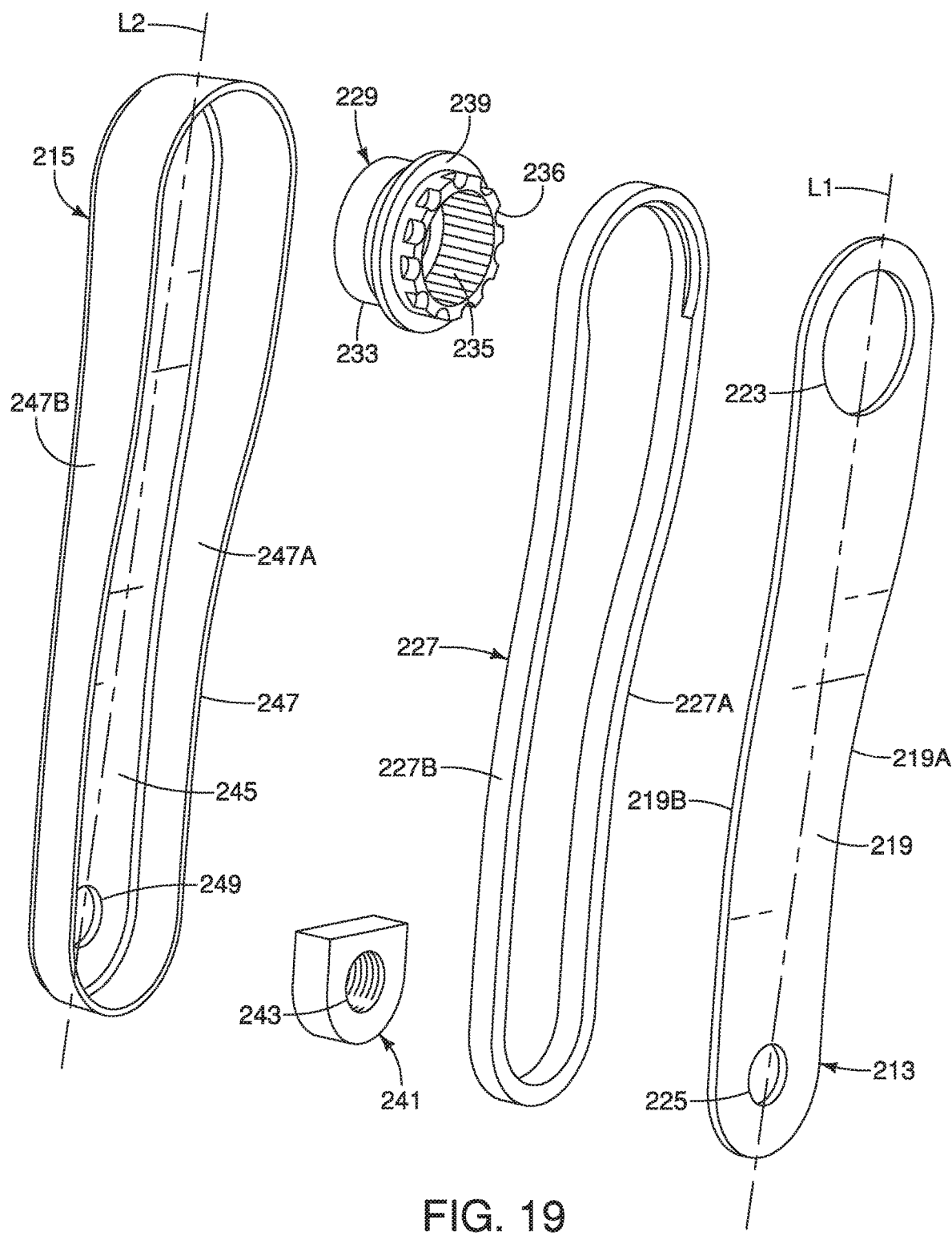
FIG. 19 is an exploded perspective view of the base member and the cover member of the bicycle crank arm illustrated in FIG. 18.

As shown in FIGS. 18 and 19, the base member 213 has a first body portion 219 that extends in the radial direction of a crank axle 221 connected to the bicycle crank arm 211. A crank axle receiving opening 223 is disposed in the first body portion 219 of the base member 213. A pedal axle receiving opening 225 is disposed in the first body portion 219 of the base member 213 at an opposite end of the first body portion 219 with respect to the crank axle receiving opening 223.

As shown in FIGS. 15, 18 and 19, a reinforcement member 227 is configured to reinforce one of the base member (i.e., the first structural member) 213 and the cover member (i.e., the second structural member) 215. The base member 213 and the cover member 215 have first and second longitudinal centerlines L1 and L2, respectively, that extend in the longitudinal direction and are substantially perpendicular to the rotational axis A, as shown in FIGS. 18 and 19. The reinforcement member 227 extends along a longitudinal direction substantially parallel to at least one of the first and second longitudinal centerlines L1 and L2. Although the reinforcement member 227 is shown as extending in a direction substantially parallel to both the first and second longitudinal centerlines L1 and L2, the base member 213 or the cover member 215 can be configured differently such that the reinforcement member 227 extends in a direction parallel to a longitudinal centerline of only one of the base member 213 and the cover member 215. Accordingly, the one of the base member (i.e., the first structural member) and the cover member (i.e., the second structural member) has a longitudinal centerline, and the reinforcement member 227 extends in a longitudinal direction parallel to the longitudinal center line. As shown in FIGS. 18 and 19, the reinforcement member 227 includes a first reinforcement portion 227A disposed in a vicinity of a first longitudinal side edge 219A of the one of the base member (i.e., the first structural member) and the cover member (i.e., the second structural member), and a second reinforcement portion 227B disposed in a vicinity of a second longitudinal side edge 219B of the one of the base member (i.e., the first structural member) 213 and the cover member (i.e., the second structural member) 215. Alternatively, as shown in FIGS. 15, 18 and 19, the reinforcement member 227 includes the first reinforcement portion 227A disposed in a vicinity of a first longitudinal side edge 247A of the one of the base member (i.e., the first structural member) 213 and the cover member (i.e., the second structural member) 215, and the second reinforcement portion 227B disposed in a vicinity of a second longitudinal side edge 247B of the one of the base member (i.e., the first structural member) 213 and the cover member (i.e., the second structural member) 215 when the reinforcement member 227 is disposed in the cover member 215.

The reinforcement member 227 is made of a carbon reinforced material. The reinforcement member 227 can be attached to the first body portion 219 of the base member 213, as shown in FIG. 18. The reinforcement member 227 extends substantially continuously along an outer perimeter of the first body portion 219 (entire circumference of the first body portion 219). The reinforcement member 227 can be attached to the base member 213 in any suitable manner, such as with an adhesive. In such embodiment, the reinforcement member 227 is a separate member from the base member 213 and is preferably made of a thermosetting resin material. Accordingly, the reinforcement member 227 is a separate member from the one of the base member (i.e., the first structural member) 213 and the cover member (i.e., the second structural member) 215. The reinforcement member 227 is attached to the one of the base member (i.e., the first structural member) 213 and the cover member (i.e., the second structural member) 215 by an adhesive.

Alternatively, the reinforcement member 227 can be integrally molded with the base member 213 as a unitary, one-piece member. Preferably, the reinforcement member 227 is fixedly secured to the base member 213 by an integral molding process so that the resin of the reinforcement member 227 extends into the base member 213 during the formation of the reinforcement member 227. The term "integral molding process" as used herein refers to molding of the reinforcement member 227, which is at least partially made of resin, while simultaneously attaching the reinforcement member 227 to the base member 213. In such embodiment, the reinforcement member 227 is preferably made of a thermoplastic resin material. Alternatively, the reinforcement member 227 can be formed as a unitary, one-piece member with the base member 213.

Figure 16:
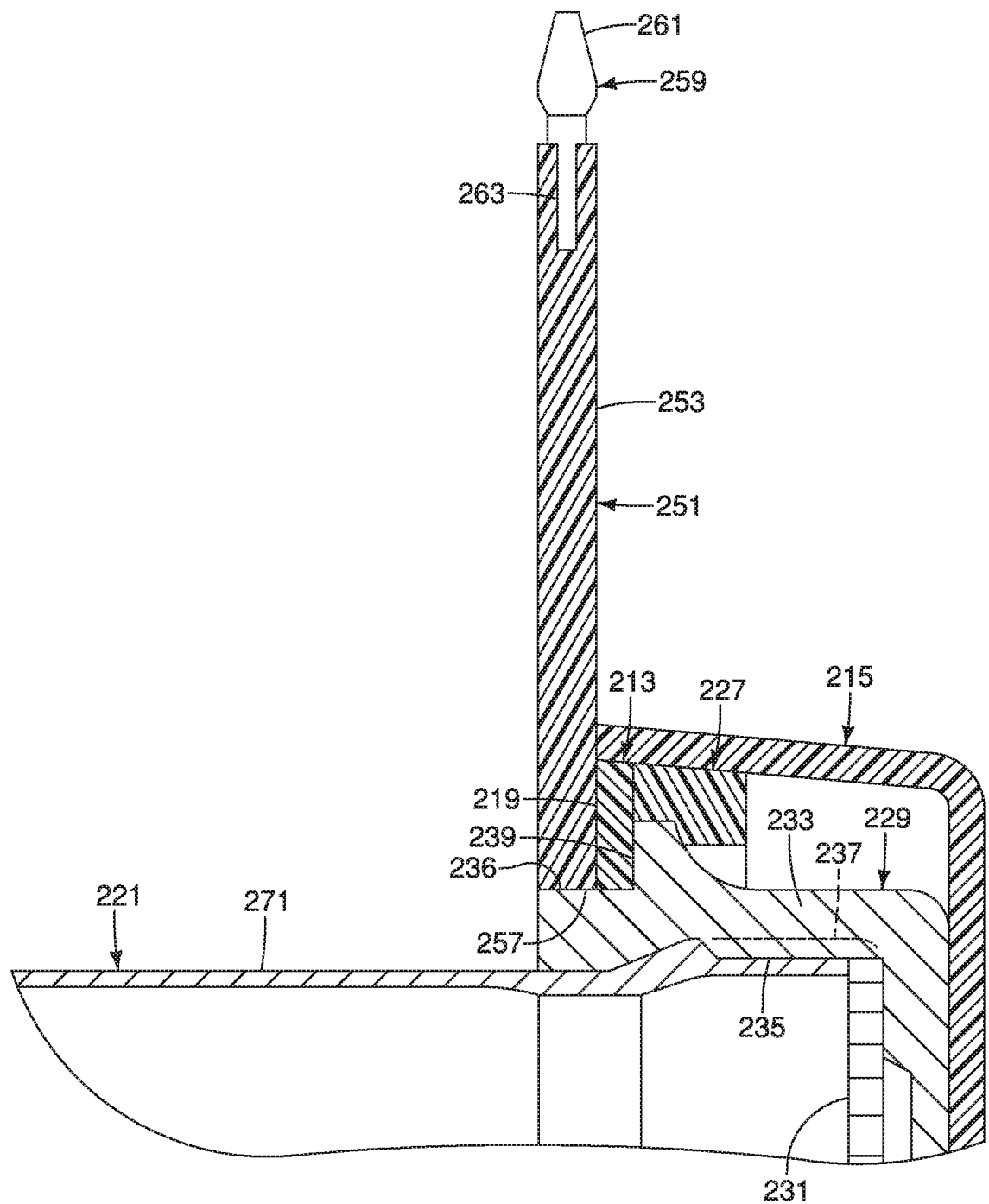
FIG. 16 is a partial enlarged view in cross section of the bicycle crank arm illustrated in FIG. 15.
Figure 17:
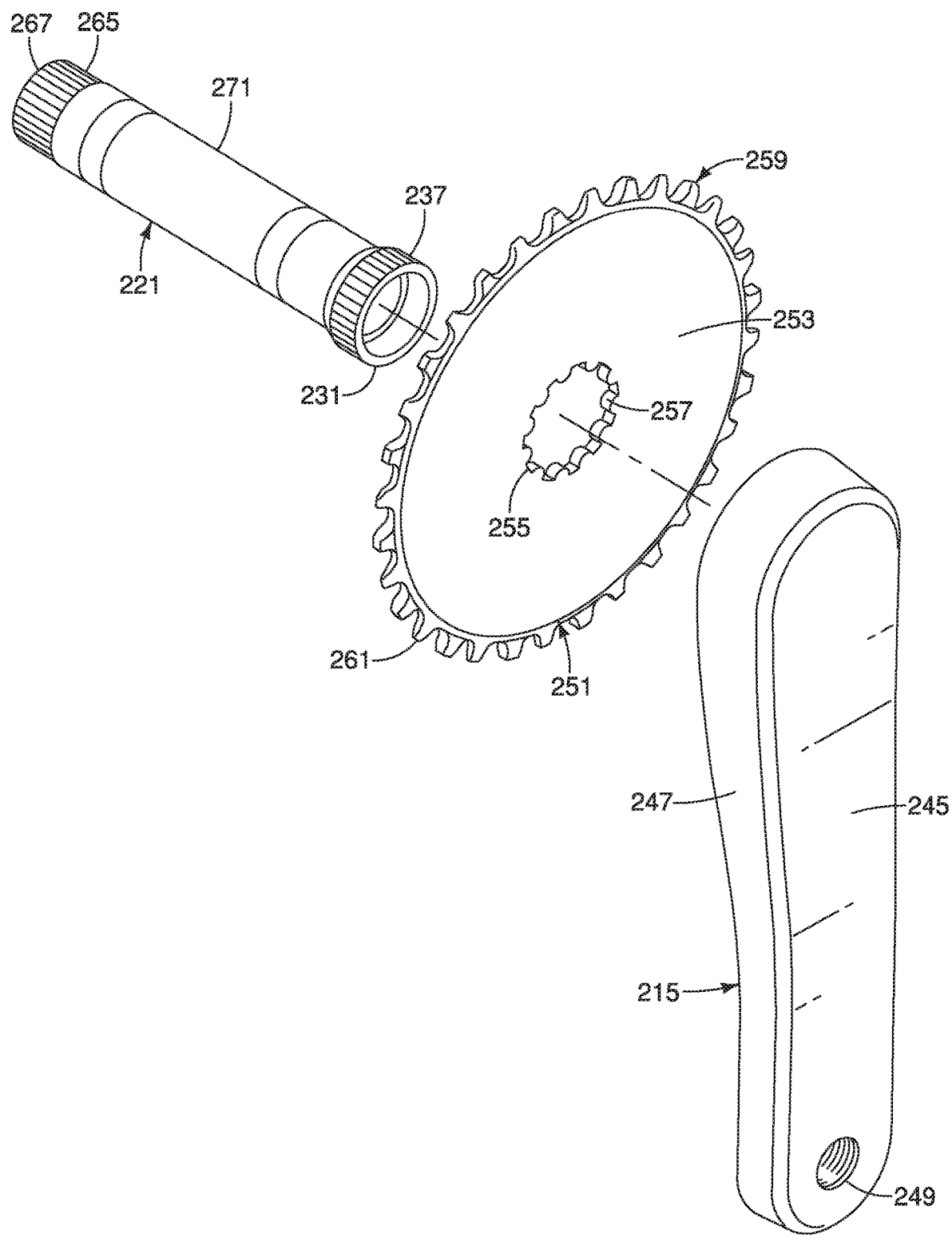
FIG. 17 is an exploded perspective view of the bicycle crank arm illustrated in FIG. 11.

As shown in FIGS. 18 and 19, a crank axle receiving portion 229 is disposed on the first body portion 219 of the base member 213. The crank axle receiving portion 229 engages the first end portion 231 of the crank axle 221 to support the first end portion 231. In the illustrated embodiment, the crank axle receiving portion 229 is formed as a unitary, one-piece member. The crank axle receiving portion 229 has a cylindrical portion 233, a plurality of internal splines 235 and a plurality of recesses 236, as shown in FIGS. 16 and 19. The internal splines 235 are formed on an internal circumferential surface of the cylindrical portion 233. The internal splines 235 are configured to engage with first splines 237 of the first end portion 231 of the crank axle 221 such that the base member 213 and the crank axle 221 rotate as a unit. The plurality of recesses 236 are formed axially forward of the internal splines 235 in a direction away from the cover member 215. The plurality of recesses 236 form a serrated portion configured to engage the sprocket teeth mounting portion 251, as shown in FIGS. 15 and 16, such that the sprocket teeth mounting portion 251 is directly mounted on the crank axle receiving portion 229. The first end portion 231 of the crank axle 221 is inserted in the cylindrical portion 233 of the crank axle receiving portion 229 to engage the internal splines 235 with the first splines 237. A shoulder 239 of the crank axle receiving portion 229 engages the crank axle receiving opening 223 in the first body portion 219 of the base member 213. The shoulder 239 is disposed between the internal splines 235 and the recesses 236 in an axial direction parallel to the rotation axis A.

The crank axle receiving portion 229 is attached to the base member 213 in any suitable manner, such as with an adhesive. The crank axle 221 is fixed to the base member 213 by being inserted in the cylindrical portion 233 in a press-fit manner so that the first splines 237 formed on the first end portion 231 engage the internal splines 235 of the crank axle receiving portion 229. Alternatively, the crank axle receiving portion 229 can also be configured to be fixedly coupled to the crank axle 221 with an adhesive. In such a case, the first splines 237 of the crank axle 221 and the internal splines 235 of the crank axle receiving portion 229 are fitted together with a gap in-between instead of in a press-fit manner. Furthermore, it is also acceptable to fix the crank axle 221 to the base member 213 with an axle bolt or by swaging or by crimping. As shown in FIGS. 11, 12, 14 and 15, a portion of the cover member 215 faces the crank axle receiving portion 229 to cover the crank axle receiving portion 229 such that the crank axle receiving portion 229 is not exposed to be visible from the outside. The crank axle receiving portion 229 can be alternatively disposed on the cover member 215 in a similar manner. Alternatively, the crank axle 221 can be unitarily formed as a one-piece member with the base member 213. In such configuration, the crank axle 221 and the base member 213 can be made of a carbon-reinforced material.

As shown in FIGS. 18 and 19, a pedal axle receiving portion 241 is mounted on the first body portion 219 of the base member 213. The pedal axle receiving portion 241 is disposed at an opposite longitudinal end of the first body portion 219 from the crank axle receiving portion 229. The pedal axle receiving portion 241 has a pedal axle mounting threaded hole 243, which is aligned with the pedal axle receiving opening 225 in the first body portion 219 of the base member 213. The pedal axle receiving portion 241 is attached to the base member 213 in any suitable manner, such as with an adhesive.

Figure 11:
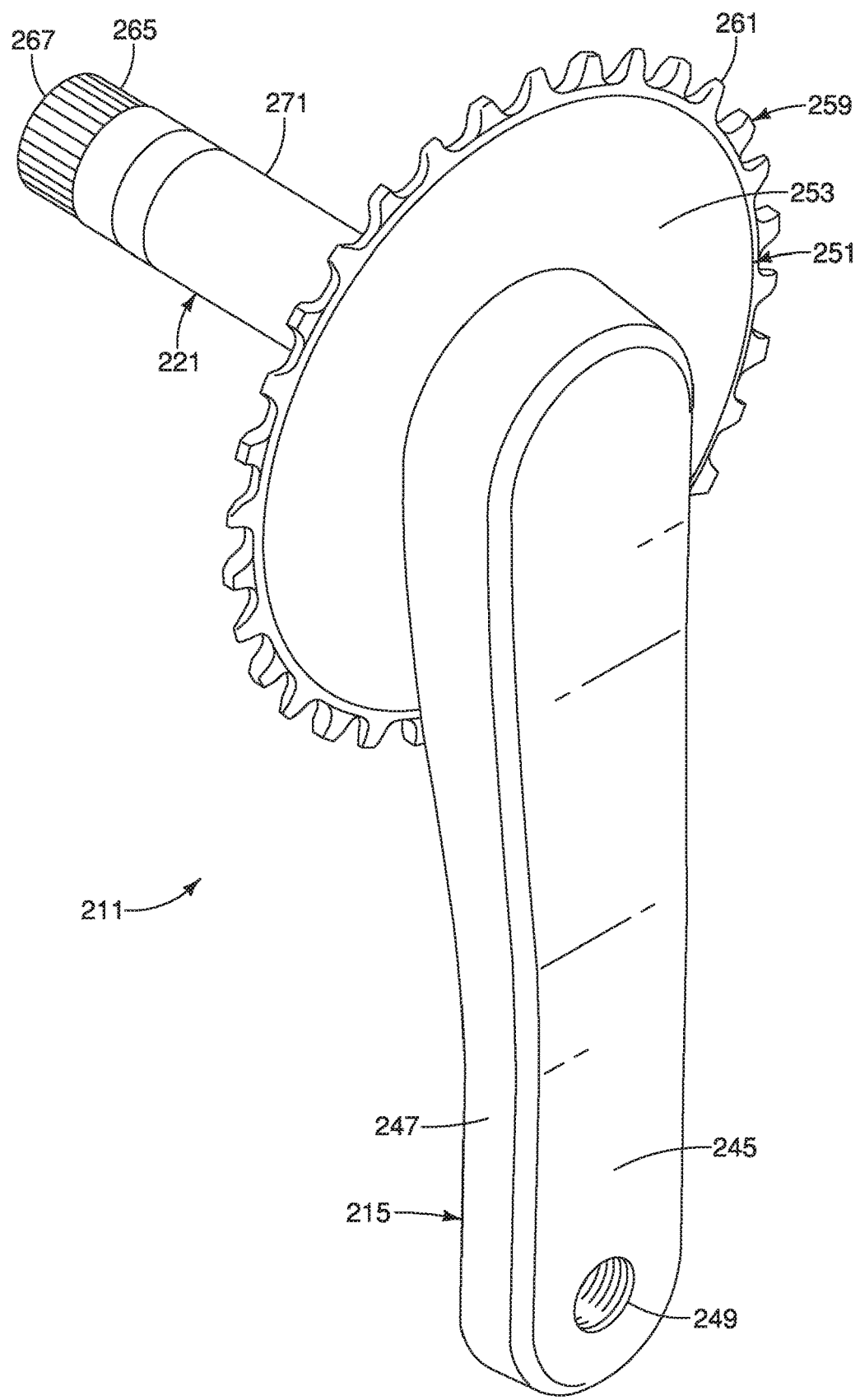
FIG. 11 is a perspective view of a bicycle crank arm in accordance with still another illustrated embodiment.
Figure 12:
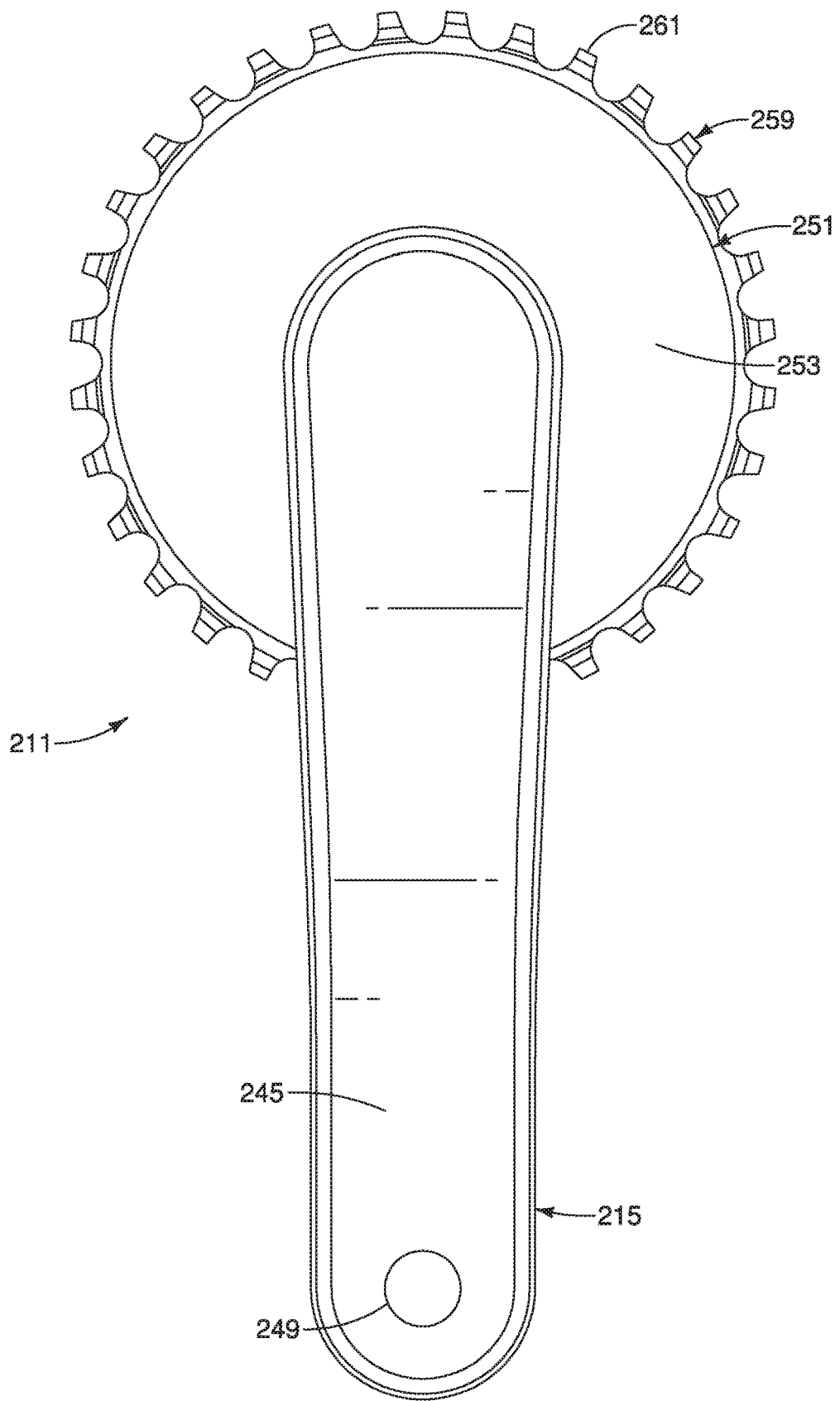
FIG. 12 is a front elevational view of a base member of the bicycle crank arm illustrated in FIG. 11.
Figure 13:
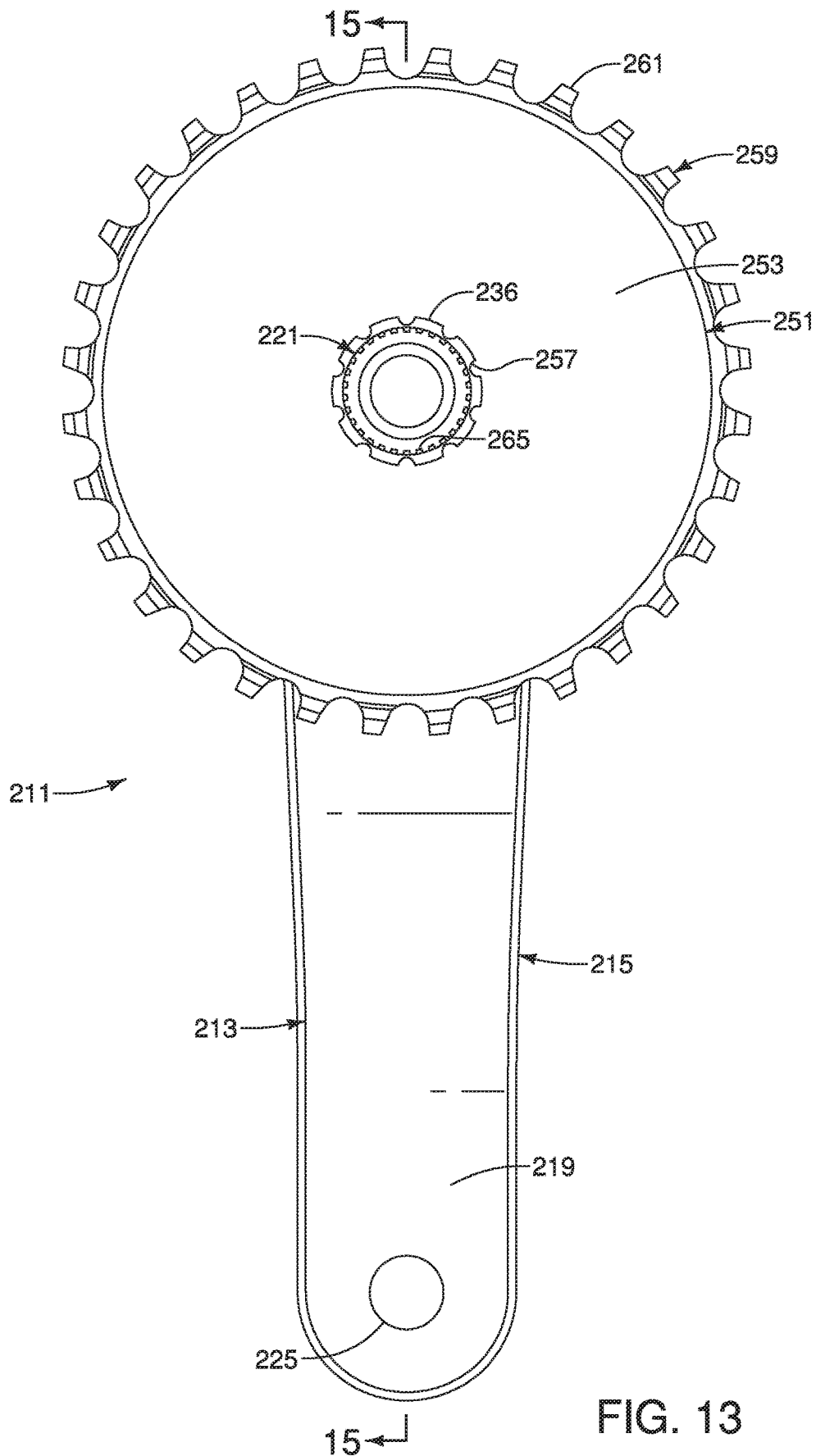
FIG. 13 is a rear elevational view of a base member of the bicycle crank arm illustrated in FIG. 11.
Figure 14:
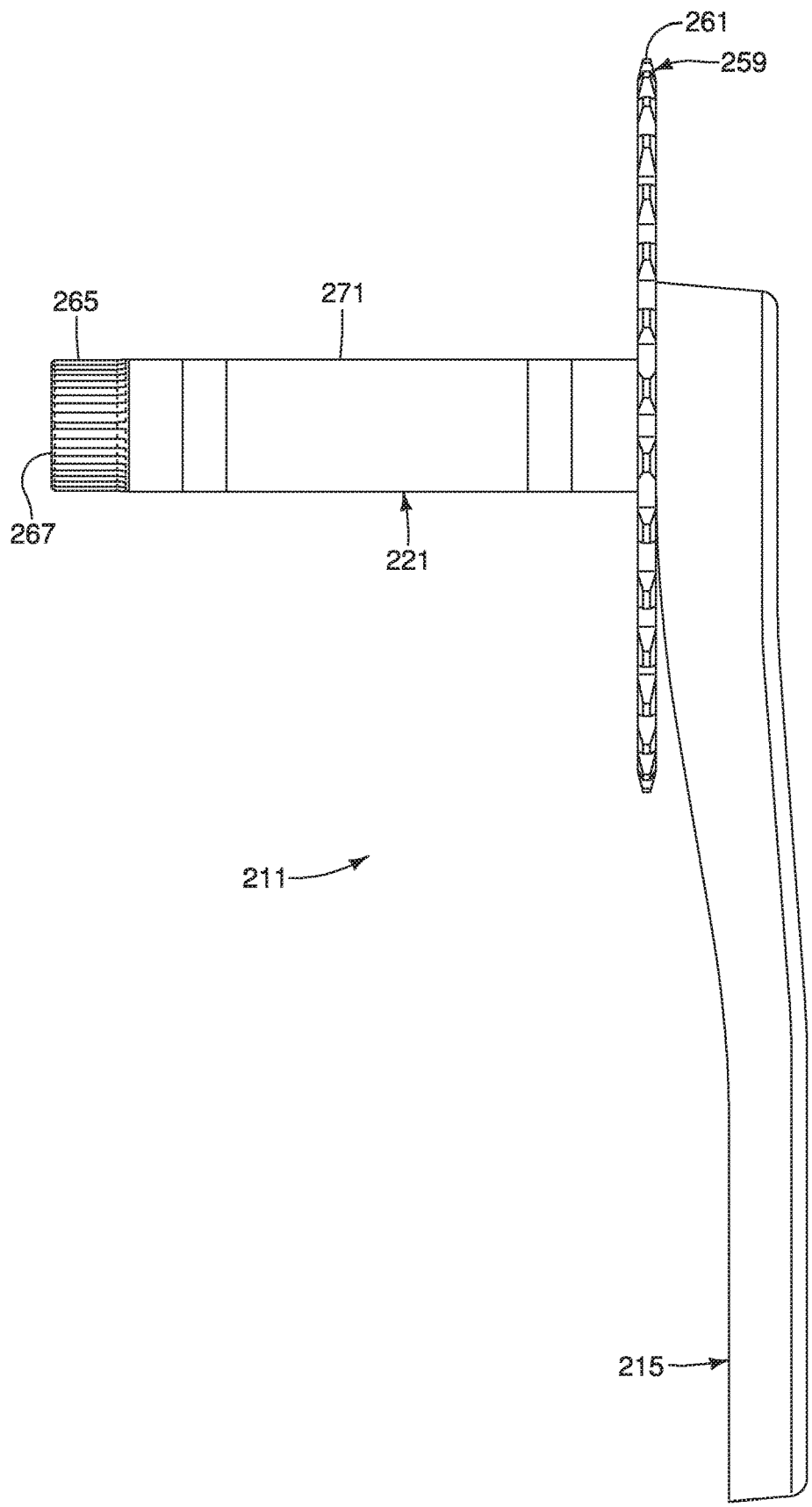
FIG. 14 is a side elevational view of the bicycle crank arm illustrated in FIG. 11.

The cover member 215 has a second body portion 245 and a wall portion 247 extending therefrom, as shown in FIGS. 18 and 19. The wall portion 247 extends in an axial direction with respect to a rotational axis A and continuously surrounds an outer perimeter of the second body portion 245. The second body portion 245 is arranged to face the first body portion 219 such that the second body portion 245 covers the first body portion 219 of the base member 213, as shown in FIGS. 11 to 13. A pedal axle receiving opening 249 is aligned with the pedal axle receiving opening 225 in the base member 213 and the pedal axle mounting threaded hole 243 in the pedal axle receiving portion 241 when the cover member 215 is attached to the base member 213. The internal space 217 is formed between the base member 213 and the cover member 215, as shown in FIG. 15, when the base member 213 and the cover member 215 are attached to each other. The wall portion 247 is attached to the first body portion 219 with, for example, an adhesive. As shown in FIGS. 11 to 14 and 17, the reinforcement member 227, the crank axle receiving portion 229 and the pedal axle receiving portion 241 are not visible from the outside when the cover member 215 is attached to the base member 213.

Although shown attached to the base member 213, the reinforcement member 227 can alternatively be attached to the cover member 215 in a similar manner. In such an embodiment, the reinforcement member 227 extends substantially continuously along an outer perimeter of the second body portion 245 and adjacent the wall portion 247.

Figure 20:
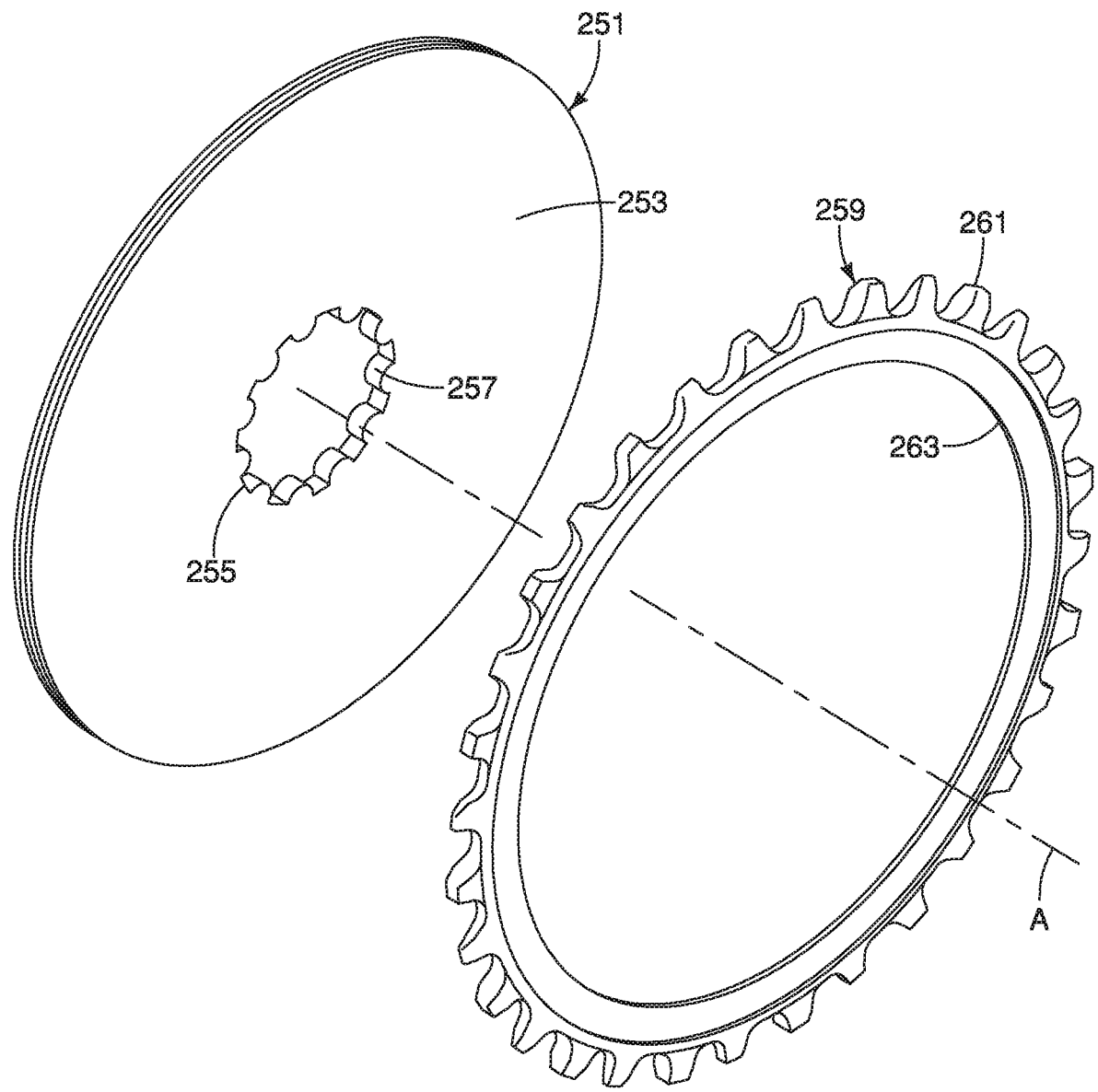
FIG. 20 is an exploded perspective view of a sprocket teeth mounting portion and a tooth member of the bicycle crank arm illustrated in FIG. 18.

The sprocket teeth mounting portion 251 has an annular body member 253, as shown in FIG. 20. The sprocket teeth mounting portion 251 is preferably made of a non-metallic member, such as a resin. However, the sprocket teeth mounting portion 251 can be made of a metallic member or composite member including both of the non-metallic material and the metallic material. A crank axle receiving opening 255 is disposed in the annular body member 253. A plurality of projections 257 extend radially inward with respect to the rotational axis A.

The tooth member 259 is a ring shaped member that has a plurality of teeth 261. The tooth member 259 is integrally formed as a one-piece, unitary member and made of a metallic material. The teeth 261 extend radially outward with respect to the rotation axis A. The teeth 261 are illustrated as being substantially identical, however the teeth 261 can have a variety of configurations as needed and/or desired.

The tooth member 259 is attached to an outer periphery of the sprocket teeth mounting portion 251, as shown in FIGS. 15, 16 and 18. The tooth member 259 is connected to the sprocket teeth mounting portion 251 in any suitable manner, such as by molding, bonding or mechanical connection via fasteners, such that a one-piece, non-separable member is formed. An inner peripheral edge 263 is received between opposing outer surfaces of the annular body member 253 during the assembly process, as shown in FIG. 16, thereby forming a rigid structure. The sprocket teeth mounting portion 251 and the tooth member 259 form a composite bicycle component (i.e., a component including two or more members that are secured together to form a non-separable unit). The composite component includes one or more metallic parts and one or more resin parts that are secured together to be comparable in rigidity to an all metallic component while also providing weight-saving as compared to an all metallic component. Alternatively, the sprocket teeth mounting portion 251 and the tooth member 259 are formed as a one-piece, unitary member. In such a configuration, the sprocket teeth mounting portion 251 and the tooth member 259 can be formed by a metallic material.

The sprocket teeth mounting portion 251 is disposed on the crank axle receiving portion 229 such that the projections 257 of the sprocket teeth mounting portion 251 engage the recesses 236 of the crank axle receiving portion 229, thereby directly engaging the sprocket teeth mounting portion 251 with the crank axle receiving portion 229. Accordingly, the sprocket teeth mounting portion 251 rotates with the crank axle 221 as a unit.

The bicycle crank arm 211 is non-rotatably mounted to the first end portion 231 of the crank axle 221, as shown in FIGS. 15 and 16. The crank axle 221 is preferably a hollow pipe-shaped member made of chrome-molybdenum steel or another such highly rigid alloy, for example. The first end portion 231 of the crank axle 221 is fixed to the bicycle crank arm 211 in any suitable manner, such as by press-fitting, swaging, crimping and/or an adhesive, for example. In the illustrated embodiment, the adhesive can be any suitable adhesive, such as an epoxy type adhesive. The crank axle 221 includes the plurality of axially extending first splines 237 disposed at the first end portion 231 of the crank axle 221 and a plurality of axially extending second splines 265 disposed at a second end portion 267 of the crank axle 221. The first splines 237 are configured and arranged to extend radially outward from an outer peripheral surface 271 of the crank axle 221. The second splines 265 are configured and arranged not to protrude radially outward relative to the outer peripheral surface 271 of the crank axle 221, as shown in FIG. 15. The first splines 237 engage the internal splines 235 of the crank axle receiving portion 229 such that the crank axle 221 and the bicycle crank arm 211 rotate as a unit. The second end portion 267 of the crank axle 221 is connected to another crank arm (not shown).

In the illustrated embodiment, the cover member 215 is attached to the base member 213 with, for example, an adhesive. Specifically, the wall portion 247 of the cover member 215 has a shape that continuously surrounds the outer perimeter of the first body portion 219 of the base member 213. Accordingly, the base member 213 and the cover member 215 can be securely coupled to each other. As shown in FIG. 15, for example, each of the base member (i.e., the first structural member) 213 and the cover member (i.e., the second structural member) 215 extends at least between the crank axle receiving portion 229 and the pedal axle receiving portion 241 in a state where the base member (i.e., the first structural member) 213 and the cover member (i.e., the second structural member) 215 are attached to each other.

The exemplary embodiments of the present invention provide a bicycle crank arm that is lightweight and rigid.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle crank arm. Accordingly, these directional terms, as utilized to describe the bicycle crank arm should be interpreted relative to a bicycle in an upright riding position on a horizontal surface and that is equipped with the bicycle crank arm. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A bicycle crank arm comprising:
   a first structural member made of a first material including a non-metallic material;
   a second structural member attached to the first structural member, and the second structural member being made of a second material that is different from the first material;
   a reinforcement member configured to reinforce one of the first structural member or the second structural member; and
   a sprocket teeth mounting portion having an outer peripheral edge, the outer peripheral edge of the sprocket teeth mounting portion having an annular shape,
   the reinforcement member being disposed adjacent to the outer peripheral edge of the sprocket teeth mounting portion and extending continuously along an entirety of the outer peripheral edge of the sprocket teeth mounting portion, the reinforcement member being a separate member from the sprocket teeth mounting portion.

2. The bicycle crank arm according to claim 1, wherein at least one of the first structural member and the second structural member includes at least one of a crank axle receiving portion and a pedal axle receiving portion.

3. The bicycle crank arm according to claim 2, wherein one of the first structural member and the second structural member includes both of the crank axle receiving portion and the pedal axle receiving portion.

4. The bicycle crank arm according to claim 2, wherein one of the first structural member and the second structural member includes one of the crank axle receiving portion and the pedal axle receiving portion; and
   the other of the first structural member and the second structural member includes the other of the crank axle receiving portion and the pedal axle receiving portion.

5. The bicycle crank arm according to claim 2, wherein each of the first structural member and the second structural member extends at least between the crank axle receiving portion and the pedal axle receiving portion in a state where the first structural member and the second structural member are attached to each other.

6. The bicycle crank arm according to claim 2, wherein the crank axle receiving portion and the pedal axle receiving portion are made of a metallic material.

7. The bicycle crank arm according to claim 1, wherein the second material is a metallic material.

8. The bicycle crank arm according to claim 1, wherein the second material includes a non-metallic material.

9. The bicycle crank arm according to claim 8, wherein the non-metallic material is a carbon-reinforced material.

10. The bicycle crank arm according to claim 1, wherein the reinforcement member is a separate member from the one of the first structural member and the second structural member.

11. The bicycle crank arm according to claim 10, wherein the reinforcement member is attached to the one of the first structural member and the second structural member by an adhesive.

12. The bicycle crank arm according to claim 10, wherein the reinforcement member is integrally molded to the one of the first structural member and the second structural member.

13. The bicycle crank arm according to claim 10, wherein the reinforcement member is made of a third material that is different from the first material.

14. The bicycle crank arm according to claim 13, wherein the third material is different from the second material.

15. The bicycle crank arm according to claim 13, wherein the first material has a density that is greater than a density of the third material.

16. The bicycle crank arm according to claim 1, wherein the outer peripheral edge of the sprocket teeth mounting portion surrounds a crank axle receiving portion of one of the first and second structural members,
the first structural member has at least one opening disposed between the outer peripheral edge and the crank axle receiving portion, and
a portion of the reinforcement member extends along an outer periphery of the at least one opening.

17. The bicycle crank arm according to claim 16, wherein the portion of the reinforcement member extends continuously along the outer periphery of the at least one opening.

18. The bicycle crank arm according to claim 1 wherein the outer peripheral edge of the sprocket teeth mounting portion surrounds a crank axle receiving portion of one of the first and second structural members, the sprocket teeth mounting portion being a separate member from the first structural member and the second structural member.

19. The bicycle crank arm according to claim 18, wherein the sprocket teeth mounting portion is made of a non-metallic material.

20. The bicycle crank arm according to claim 18, wherein a periphery of the sprocket teeth mounting portion engages with a periphery of one of the first structural member and the second structural member.

21. The bicycle crank arm according to claim 1, wherein the second structural member is attached to the first structural member by adhesive.

22. A bicycle crank arm comprising:
a first structural member made of a first material;
a second structural member made of a second material;
a reinforcement member configured to reinforce the first structural member, the reinforcement member being a separate member from the first structural member, the reinforcement member being made of a third material that is different from at least one of the first material and the second material; and
a sprocket teeth mounting portion having an outer peripheral edge, the outer peripheral edge of the sprocket teeth mounting portion having an annular shape,
the reinforcement member being disposed adjacent to the outer peripheral edge of the sprocket teeth mounting portion and extending continuously along an entirety of the outer peripheral edge of the sprocket teeth mounting portion, the reinforcement member being a separate member from the sprocket teeth mounting portion.

23. The bicycle crank arm according to claim 22, wherein the third material is different from the second material.

* * * * *